(12) United States Patent
Rajasekaran et al.

(10) Patent No.: US 7,454,782 B2
(45) Date of Patent: Nov. 18, 2008

(54) METHOD AND SYSTEM FOR CAMOUFLAGING ACCESS-CONTROLLED DATA

(75) Inventors: Sanguthevar Rajasekaran, Los Altos, CA (US); Geoffrey R. Hird, Cupertino, CA (US); Balas Natarajan Kausik, Los Gatos, CA (US)

(73) Assignee: Arcot Systems, Inc., Santa Clara, CA (US)

(*) Notice: Subject to any disclaimer, the term of this patent is extended or adjusted under 35 U.S.C. 154(b) by 914 days.

(21) Appl. No.: 10/015,902

(22) Filed: Oct. 30, 2001

(65) Prior Publication Data

US 2002/0083327 A1 Jun. 27, 2002

Related U.S. Application Data

(60) Continuation-in-part of application No. 09/874,795, filed on Jun. 5, 2001, now Pat. No. 7,328,350, and a continuation-in-part of application No. 09/750,511, filed on Dec. 27, 2000, now Pat. No. 6,956,950, which is a division of application No. 08/996,758, filed on Dec. 23, 1997, now Pat. No. 6,170,058.

(60) Provisional application No. 60/280,629, filed on Mar. 29, 2001.

(51) Int. Cl.
*H04L 9/32* (2006.01)

(52) U.S. Cl. .......................................... 726/4; 713/182

(58) Field of Classification Search ................ 713/182, 713/183, 185, 202, 184
See application file for complete search history.

(56) References Cited

U.S. PATENT DOCUMENTS 3,798,605 A 3/1974 Feistel ...................... 340/172.5
4,386,233 A * 5/1983 Smid et al. .................. 380/281

(Continued)

FOREIGN PATENT DOCUMENTS

FR 2747208 10/1997

(Continued)

OTHER PUBLICATIONS

Rachna,Dhamija; Adrian, Perrig; DeJa Vu: A User Study Using Images for Authentication, Aug. 2000, 9th Usenix Security Symposium.*

(Continued)

*Primary Examiner*—Pramila Parthasarathy
(74) *Attorney, Agent, or Firm*—Townsend and Townsend and Crew LLP

(57) ABSTRACT

A computer-representable object (including, without limitation, a cryptographic key, or a graph or a Boolean description of a system) is secured using a generalized camouflaging technique. The secured object need not be stored in the system, not even in encrypted form. Instead, the technique employs a composition function that regenerates the secured object when one inputs a valid password (which may be any computer-representable information held by a user). By regenerating the secured object each time a valid password is entered, there is no need to store the secured object. If one inputs an invalid password, the technique may generate an incorrect object, such that the user is unable to distinguish this incorrect object from the secured object. If the user tries to use the incorrect object, the user can be exposed as unauthorized, without the user's knowledge that he has been exposed.

66 Claims, 10 Drawing Sheets

U.S. PATENT DOCUMENTS

| | | | | |
|---|---|---|---|---|
| 5,206,905 | A | | 4/1993 | Lee et al. ................... 380/4 |
| 5,375,169 | A | | 12/1994 | Scheidt et al. ............... 380/21 |
| 5,559,961 | A | * | 9/1996 | Blonder ..................... 713/202 |
| 5,604,801 | A | | 2/1997 | Dolan et al. ................. 380/21 |
| 5,668,876 | A | | 9/1997 | Falk et al. ................... 380/25 |
| 5,745,574 | A | | 4/1998 | Muftic ....................... 380/23 |
| 5,761,306 | A | | 6/1998 | Lewis ........................ 380/21 |
| 5,787,173 | A | | 7/1998 | Scheidt et al. ............... 380/21 |
| 5,818,936 | A | * | 10/1998 | Mashayekhi ............... 713/167 |
| 5,894,519 | A | | 4/1999 | Clemot et al. ............... 380/23 |
| 6,002,768 | A | | 12/1999 | Albanese et al. ............ 380/25 |
| 6,061,799 | A | * | 5/2000 | Eldridge et al. ............. 713/202 |
| 6,173,282 | B1 | * | 1/2001 | McCaughan et al. ......... 707/9 |
| 6,408,388 | B1 | | 6/2002 | Fischer ...................... 713/176 |

FOREIGN PATENT DOCUMENTS

WO     WO 96/02993     2/1996

OTHER PUBLICATIONS

Hoover, D.N. et al., "Software Smart Cards via Cryptographic Camouflage," Proceedings of the 1999 IEEE Symposium on Security and Privacy, pp. 208-215.

TECSEC, "Enhancing Security Technologies," www.tecsec.com, "Company," "Contact Us," and "Products/CKM Technology Overview," 37 pages, Jun. 5, 2001.

* cited by examiner

Figure 7

| $x_1$ | $x_2$ | $x_3$ | $x_4$ | F |
|---|---|---|---|---|
| 0 | 0 | 0 | 0 | 0 |
| 0 | 0 | 0 | 1 | 0 |
| 0 | 0 | 1 | 0 | 1 |
| 0 | 1 | 1 | 1 | 1 |
| 0 | 1 | 0 | 0 | 1 |
| 0 | 1 | 0 | 1 | 1 |
| 0 | 1 | 1 | 0 | 1 |
| 1 | 0 | 1 | 1 | 0 |
| 1 | 0 | 0 | 0 | 0 |
| 1 | 0 | 0 | 1 | 0 |
| 1 | 1 | 1 | 0 | 1 |
| 1 | 1 | 0 | 1 | 1 |
| 1 | 1 | 0 | 0 | 1 |
| 1 | 1 | 1 | 1 | 0 |

METHOD AND SYSTEM FOR CAMOUFLAGING ACCESS-CONTROLLED DATA

CROSS-REFERENCE TO RELATED APPLICATIONS

This application claims the benefit of pending provisional patent application 60/280,629, filed on Mar. 29, 2001, which is hereby incorporated by reference This application is a continuation-in-part of patent application Ser. No. 09/874,795, filed on Jun. 5, 2001 now U.S. Pat. No. 7,328,350, which is hereby incorporated by reference, and which claims the benefit of pending provisional patent application 60/280,629. This application is also a continuation-in-part of patent application Ser. No. 09/750,511, filed on Dec. 27, 2000 now U.S. Pat. No. 6,956,950, which is hereby incorporated by reference, and which is a divisional of Ser. No. 08/996,758, filed Dec. 23, 1997, now U.S. Pat. No. 6,170,058.

FIELD

The present application relates generally to securing access-controlled, computer representable objects—such as data, information and instructions for executing functional transformations—through the use of a generalized camouflaging technique and, more specifically, to camouflaging computer representations of graph-modeled systems and computer representations of Boolean function-modeled systems.

BACKGROUND

"Camouflaging" is generally understood to mean a method of disguising something in such a way that it becomes virtually indistinguishable from its surroundings. For example, camouflaging in the context of war invokes a soldier wearing clothing that makes it difficult to distinguish him or her from the landscape, especially in the midst of heavy bush. In the area of computer information systems, camouflaging can be viewed as a method for protecting sensitive data or information from unauthorized access.

Ideally, a human being can protect an informationally sensitive object if he or she can remember it. Unfortunately, human recall is not always feasible for at least two reasons: 1) there may be too many objects for the person to remember; and 2) even a single object may be too large to remember.

For example, current cryptographic data security techniques secure sensitive information by encrypting it with a key. The original information can only be recovered by decrypting it using the same key or a related key; the security of the data is thus transferred to the security of the key(s). In asymmetric cryptographic methods such as RSA, for example, each user holds a matched pair of keys: a private key and a public key. The private key and the public key form a unique and matched pair such that messages encrypted with the private key (e.g., data, code, or any other digitally represented information, including other cryptographic keys or cryptographic representations of information) can only be decrypted with the corresponding public key, and vice versa. The security of such asymmetric protocols requires keeping the private key confidential to the holder thereof.

For example, Kausik discloses, inter alia, various techniques for cryptographically camouflaging such private keys, and other forms of access-controlled data in U.S. Pat. No. 6,170,058, its associated divisional application (currently pending as Ser. No. 09/750,511), filed Dec. 27, 2000, and an associated continuation-in-part U.S. Pat. No. 6,263,446. These three documents (collectively, "Kausik") are all incorporated herein by reference in their entirety. Another type of camouflaging, known as "generation camouflaging" also provides a system that is relatively secure from the kinds of hacker attacks on encrypted data systems which are described by Kausik. Generation camouflaging is discussed and claimed in a co-pending application, Ser. No. 09/874,795, filed by Hird on Jun. 5, 2001 (hereafter, "Hird"), and incorporated herein by reference in its entirety. Unlike Kausik's cryptographic camouflaging, however, Hird's generation camouflaging aims at regenerating private keys without storing the private key bit strings, either encrypted or unencrypted. Thus, generation camouflaging goes beyond Kausik, in that it does not require the secured objects to be stored in any manner (either encrypted or unencrypted), either within the wallet or in any other component of the system.

The present application extends the techniques of Hird to still other techniques for camouflaging computer-representable state information, as will be described in the sections following.

SUMMARY

A method and apparatus for camouflaging computer-representable objects such as data, information, and/or instructions for executing functional transformations. Specific examples of computer-representable objects include: a sequence of binary digits; a real or integer number; a graph (for example, a data structure tree or a connected graph representing a local area network); a table of values; a graphic; a computer program; and a system state; and any other type of state information.

As described in detail below, one embodiment of the generalized camouflaging method is related to the cryptographic camouflaging method described in Kausik. Another embodiment of the generalized camouflaging method provides for securing access-controlled, computer-represented data or information similar to the method of generation camouflaging which is described in Hird. As described therein, generation camouflaging secures data or information that is generated by functions. An exemplary application involves securing private keys in a "key wallet" for use with existing public key signature methods such as RSA, DSS, El-Gamal, elliptic curve cryptosystems, and their associated key generation, verification and certification technologies.

Another embodiment of the generalized camouflaging method provides for securing the informational content of a physical and/or logical system that is modeled by a computerized graph. Such types of information may include, for example, links and nodes in a telephone network, an access graph in the context of the Internet, and a routing graph for a package delivery company. This embodiment of generalized camouflaging is described as Graph Camouflaging Graph camouflaging is grounded in the fact that numerous physical and/or logical systems are almost exclusively modeled with the use of a graph. The state information contained in such graphs must often be secured.

Consider, for example, a telephone company. The links in the telephone network might fail with some probability at any given time. Information can be stored about how often the various links can be expected to fail by first modeling the network by a graph, where the edges in the graph correspond to physical and/or logical links in the network. Each edge in the graph is weighted with the rate at which the network link is expected to fail. Information about the system which is modeled by and contained in such a graph is useful for designers of the network, as well as for those who maintain the network, and may very well constitute a trade secret. Moreover, if a competitor gets a chance to look at this graph, he or she could conceivably use the information therein to the detriment of the telephone company owning the underlying physical and/or logical network. The graph camouflaging embodiment therefore provides a method and apparatus for camouflaging the data and information of a system that is modeled by a graph.

Yet another embodiment of the generalized camouflaging method provides for camouflaging a system that is modeled by a Boolean function. Boolean functions have been employed to model decision-making systems in a variety of domains. Examples include an expert system's decision-making functions, and the voting function of a governing body. This embodiment of generalized camouflaging is described as Boolean Camouflaging.

The foregoing represents a few exemplary embodiments of the generalized camouflaging method. More broadly, however, the camouflaging technology of the present invention is usable generally for securing, through camouflaging, any form of computer-representable object that carries or represents data, information, or instructions for executing functional transformations which are intended to remain secured and protected from unauthorized use or access. We describe the generalized camouflaging technique of the present invention using the following nomenclature. Let $\{O_0, O_1, O_2, \ldots O_{n-1}, O_n, \ldots, O_q\}$ be a set of computer-representable objects related to a Secret, S, which is to be secured by a computer system through camouflaging. As used herein, the term "secret" denotes any quantity to be protected against unauthorized access. The objects are related to S via a computer-implemented function, $f$, such that $f(O_0, O_1, O_2, \ldots O_{n-1}, O_n, \ldots, O_q) = S$. Objects $O_0, O_1, O_2, \ldots, O_{n-1}, O_n, \ldots, O_q$ are referred to as the Sub-Objects of S, and $f$ is referred to as the Composition Function. In the general case, a user of the generalized camouflaging system need remember, or be able to independently generate, one or more of the sub-objects of S (for example, the subset $\{O_0, O_1, \ldots O_{n-1}\}$), hereinafter referred to as the Password(s). The term "password" is used as a matter of convenience, and includes not only conventional PINs, passwords, and other types of access-codes typically held by users, but also other types of user-held information (as will be described in greater detail herein) regarding a system being camouflaged. The rest of the sub-objects (e.g., the subset $\{O_n, O_{n+1}, \ldots O_q\}$), are not remembered or generated by the user, but are rather stored in a manner accessible to the system. This storage place is referred to as the system's Wallet. The sub-objects $O_0, O_1, O_2, \ldots O_{n-1}, O_n, \ldots, O_q$ need not be of the same type or class of object as each other, nor of the secret S. The wallet can also store (but is not required to store) a description of the composition function, $f$. However, $f$ need not be stored if the appropriate parties know what this function is. For example, the wallet may be a hardware and/or software device carried by a person to be used by the person in conjunction with software (stored in a computer) to retrieve the information under concern. In this case $f$ could be stored, in part or in whole, in the wallet and/or the computer software. Those skilled in the art will readily appreciate that any conventional technique can be used to implement the computer-executable logic instructions comprising the hardware and/or software. For example, such instructions might take the form of microcode, PALs, firmware, any compiled or interpreted software language, etc.

The generalized camouflaging technique secures access to a computer-representable object in the following manner. When an authorized user wishes to access the secret, S, he or she must input the password(s) $\{O_0$ through $O_{n-1}\}$ into the system, or otherwise cause them to be entered. The system then uses the passwords in conjunction with the other sub-objects (which are stored in the system's wallet, or are otherwise independently accessible to the system) to regenerate or generate the secured secret, S. In particular, the system applies its composition function to the user input and the other sub-objects, thereby generating a system output. The output will be the secret, S, if and only if the user has entered the valid password(s), i.e., the user is an authorized user. Otherwise, the output may be meaningless, fixed, or it may be configured to resemble S in order to fool attackers into take further actions in hopes of allowing detection of the attacker. In the latter case, an unauthorized user can be fooled into believing that he or she has also accessed the secret, when in truth has accessed a different quantity, S*. The system may further be implemented such that if the unauthorized user later attempts to use S* in place of S, the system is capable of detecting such activity and identifying the unauthorized user, without the user's knowledge. In such a case, we refer to S* as a pseudo-secret.

As a matter of convenience, we shall henceforth generally describe the various embodiments of generalized camouflaging as having an output (here, S*) corresponding to an input (here, O*). The reader should appreciate that such input and output will be configured in accordance with the particular information (or lack thereof) desired to be fed back to the fraudulent user. Depending on the particular implementation of the system, the output can be meaningless, random, fixed, or pseudo-secret (also called pseudo-valid), with the input having the appropriate corresponding characteristics. In the case of a pseudo-valid quantity, a characteristic of the output would suggest to an attacker that a valid quantity has been obtained.

Persons skilled in the art will recognize that applications of generalized camouflaging include, but are not limited to: (a) strong authentication for secure remote/local access to computing and storage resources; (b) reduced user sign-on in environments with multiple computers on a network; (c) strong authentication for secure access through firewalls with or without the IPSEC network protocol; (d) digital signatures for secure electronic commerce transactions; (e) digital signatures for electronic payment mechanisms; (f) secure access to databases and/or digital signatures for database transactions; (g) secure access to routers and network switches; (h) secure access to distributed services; (i) embedded applications wherein the user is represented by a computational agent, such as a computer program (software or firmware); and (j) secure access to arbitrary objects such as graphs, Boolean functions, etc.

While the above examples mention specific applications of generalized camouflaging, those skilled in the art will recognize that generalized camouflaging is usable for securing any computer-representable object (such as objects that carry or represent data, information, or instructions for executing functional transformations) which is intended to remain secured and protected from unauthorized use or access.

BRIEF DESCRIPTION OF THE FIGURES

FIG. 7 depicts an example truth table for a decision-making process modeled by a Boolean function.

DETAILED DESCRIPTION

Figure 1A:
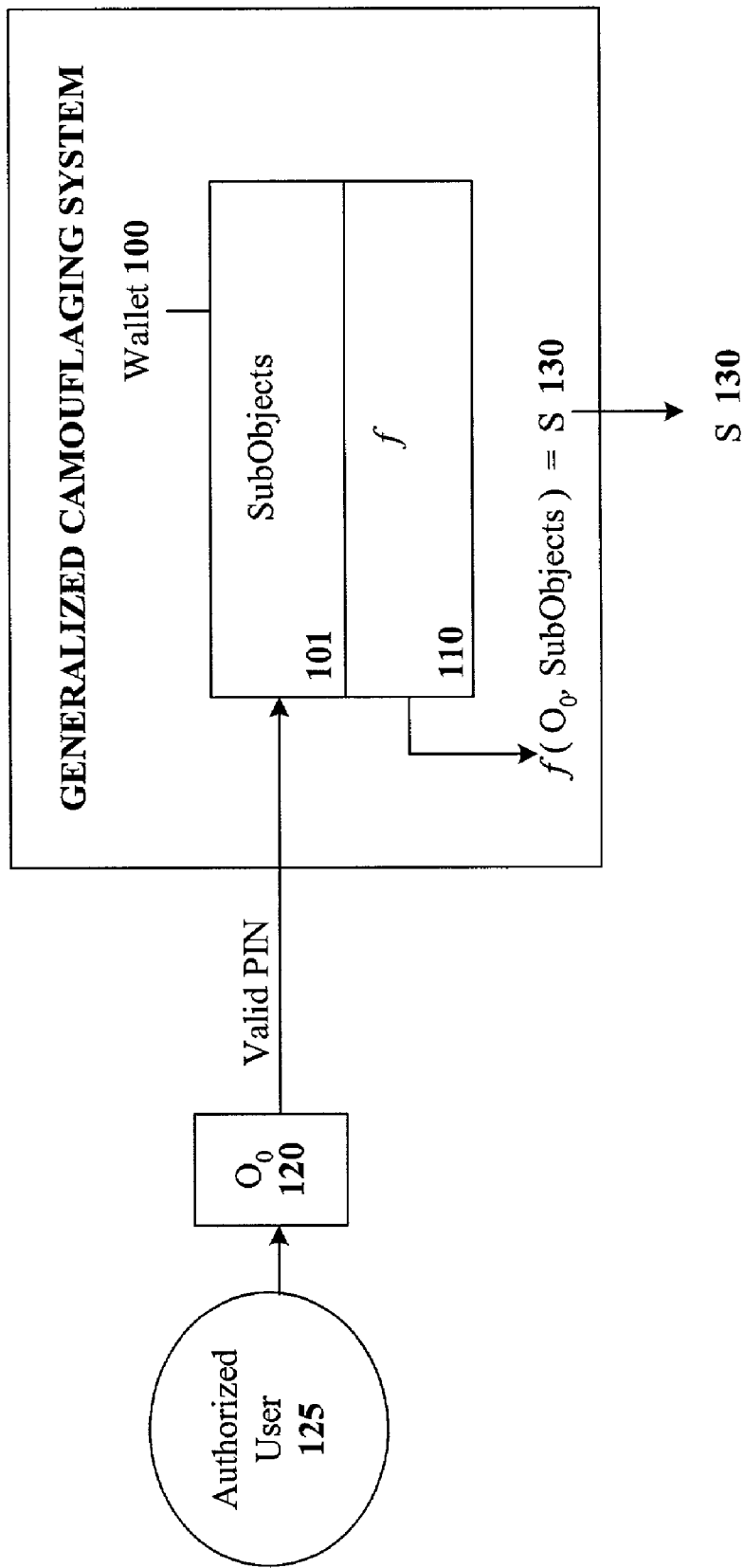
FIG. 1A is a schematic overview of the generalized camouflaging technique as applied to an authorized user.
Figure 1B:
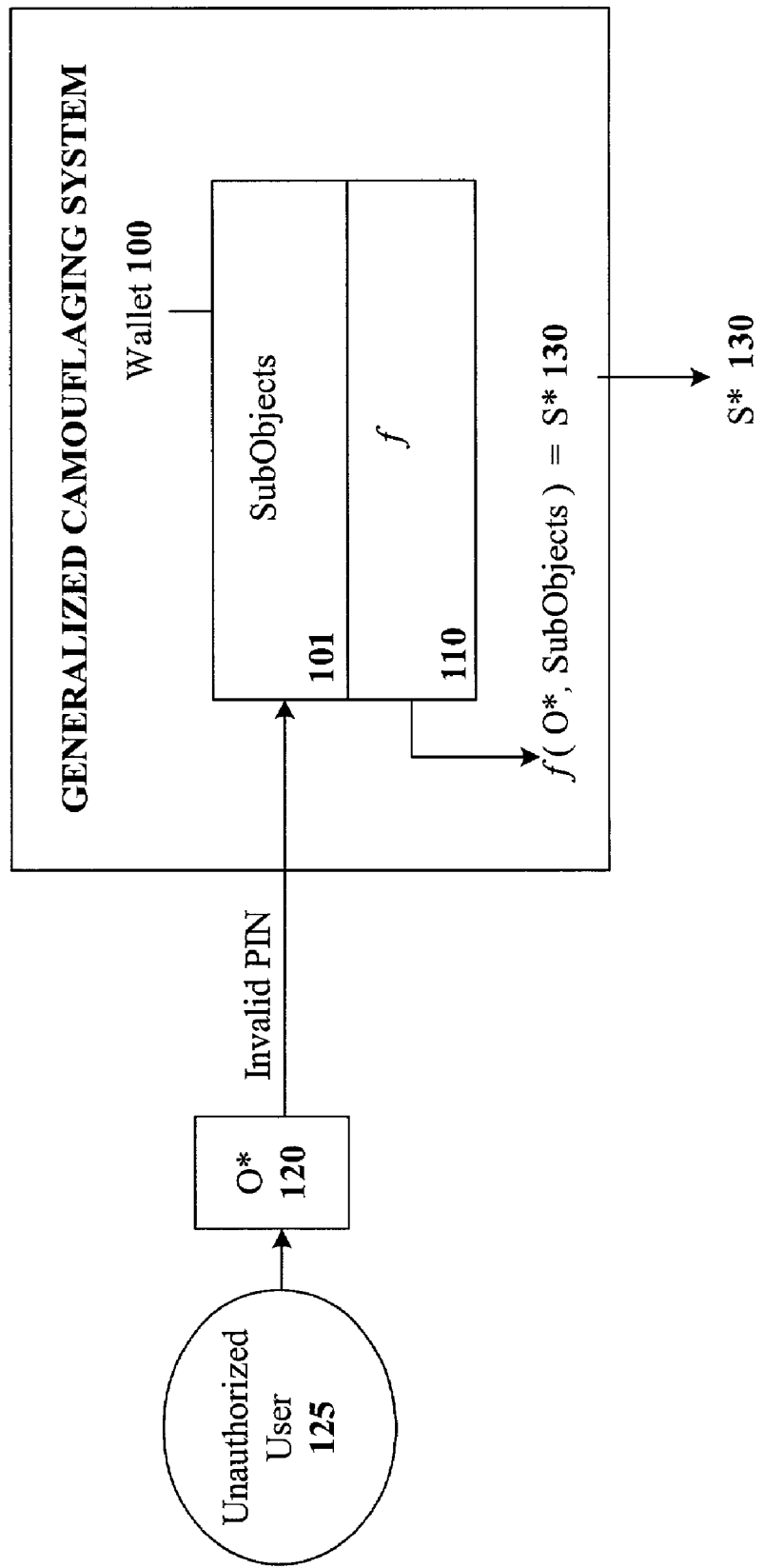
FIG. 1B is a schematic overview of the generalized camouflaging technique as applied to an unauthorized user.

FIGS. 1A and 1B give a schematic overview of the elements of an exemplary access-control system. The system performs the method of generalized camouflaging to secure access-controlled, computer-representable objects. The first component of an exemplary system is the wallet 100, which stores an arbitrary number of objects 101 (the "sub-objects" of the secret S). The sub-objects are generally of different types (e.g., numbers, alphanumeric strings, computer programs, etc.), but may be of the same type in certain embodiments.

The second component of the system is the composition function, $f$ 110, which may or may not be stored in the wallet. FIGS. 1A and 1B depict $f$ as being stored in the wallet for illustration only; alternatively, the composition function may be stored in any area accessible to the system, or may also be input to the system. The third component of the system is a user-entered input $O_0$ or $O^*$ 120, which is not stored within the wallet, but which is entered as a password(s) to the system by a user 125 (authorized or unauthorized) of the system. As a matter of convenience, the user input has been described as if it were a single quantity, although, depending on the particular implementation, the user could actually be required to enter multiple quantities. Thus, the term "user input" and the related quantities used herein should be understood to include either single or multiple quantities.

The fourth component of the system is the system's output, S (or S*) 130, which is either a true reproduction of the secured object (S) or a likeness of it (S*). Just as with the user-input, this output should be understood to include both single and multiple quantities, depending on the particular implementation.

In an exemplary embodiment, the generalized camouflaging system may be implemented as server software, running on a general-purpose computer, accessible to users of the system.

The wallet could be stored in any number of ways. For example and without limitation, it could be stored in a handheld device such as a PDA or a cell phone (in a chip in the phone), it could be stored in a special purpose chip (in which case an appropriate reader will be needed), or it could be stored in a centralized access-controlled database. Also, the password could be input through a variety of devices such as the keyboard of a computer, through a cell phone, uploaded as a file through the Internet, etc. Exemplary output devices include the monitor of a computer, the display of a cell phone or a PDA, any printer, downloaded as a file through the Internet, etc.

FIG. 1A illustrates how the generalized camouflaging process works with an authorized user. In many applications, a PIN value is used as a password to the system. Thus, for convenience, an exemplary embodiment shall be described herein using a PIN input, but should be understood to include single or multiple passwords of various types. An authorized user 125 would have a valid PIN, $O_0$ 120, and enter it into the system; the composition function $f$ 110 would then use both the user-entered PIN 120 and the sub-objects 101 that are stored in the wallet 100 to regenerate the secured object S 130. The system then outputs S 130.

FIG. 1B shows how the system works with an unauthorized user who does not have a valid PIN. Any user who enters an invalid PIN, O*, would not be able to regenerate the secured object using the system. Instead, the composition function would operate on O* and the stored sub-objects, outputting S* rather than S. The unauthorized user would be unable to distinguish S from S*, because both of these objects are of the same form, having been generated from the same function. If the user further attempts to use the "bogus" form of the secured object, S*, he or she can be detected by the system as a malicious intruder, without informing the user of the detection.

The following description provides specific examples of how the generalized camouflaging system described above may be implemented to protect particular types of computer-representable objects.

1. THE CRYPTOGRAPHIC CAMOUFLAGING EMBODIMENT

One embodiment of generalized camouflaging is the Cryptographic Camouflaging method disclosed in U.S. Pat. No. 6,170,058, its associated divisional application (currently pending as Ser. No. 09/750,511), filed Dec. 27, 2000, and an associated continuation-in-part U.S. Pat. No. 6,263,446. These three documents (collectively, "Kausik") are hereby incorporated by reference in their entirety.

Figure 2:
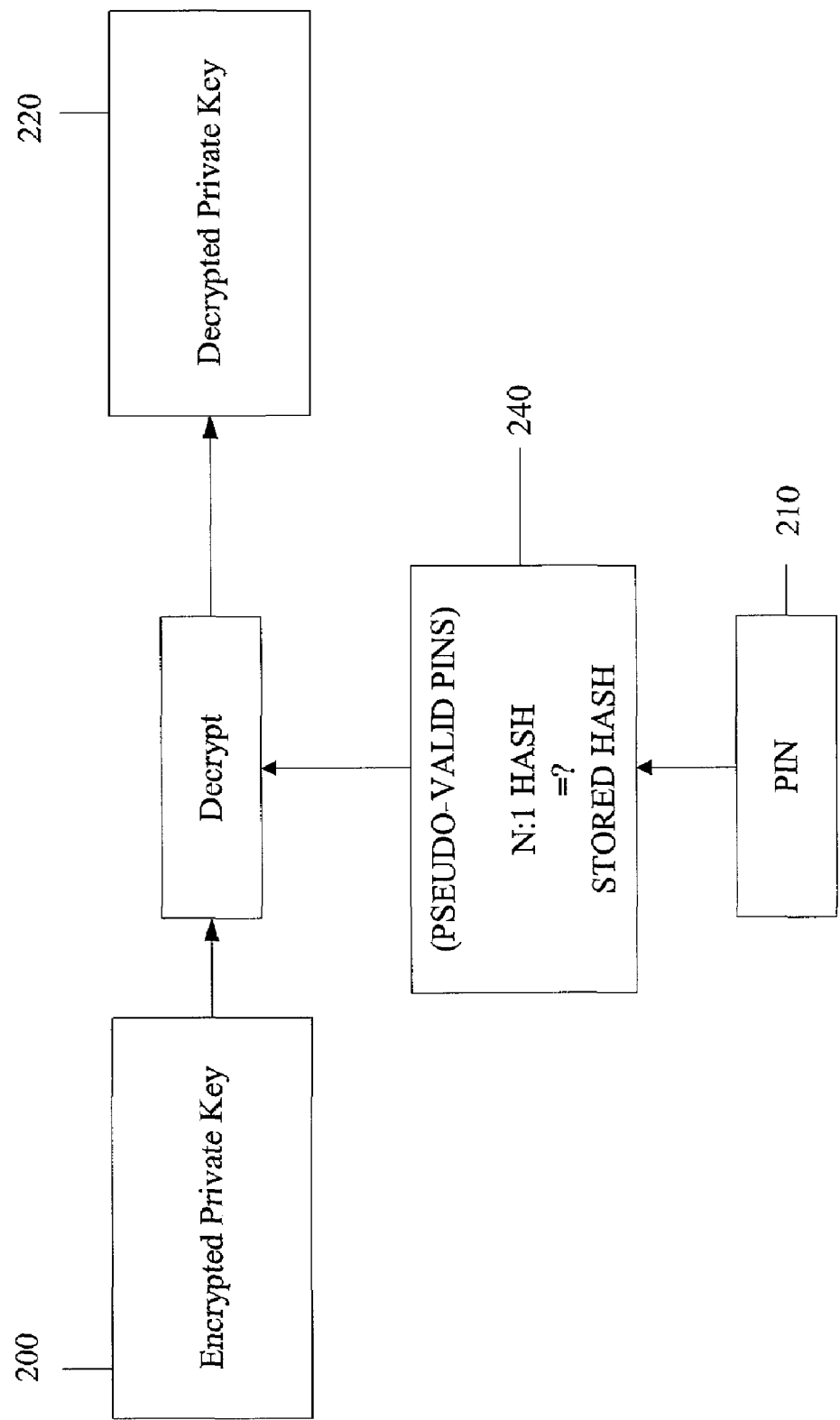
FIG. 2 is a schematic overview of the cryptographic camouflaging method of Kausik.

FIG. 2 illustrates a method of cryptographic camouflaging described by Kausik. In cryptographic camouflaging, the wallet stores a private key 200 that has been encrypted under a user's valid PIN 210. Entry of the correct PIN will correctly decrypt the stored key 220. Entry of certain "pseudo-valid" PINs will also decrypt the stored key, but improperly so, resulting in a candidate key that is indistinguishable in form from the correct key. Such pseudo-valid PINs 240 are spread thinly over the space of PINs, so that the user is unlikely to enter a pseudo-valid PIN via a typographical error in entering the correct PIN. Prior to Kausik, existing wallet technologies had lacked pseudo-valid PINs, so that only a correct PIN would produce a decrypted key; thus, hackers could find the correct PIN by entering all possible PINs until some key (any key) would be produced. Once a key was produced, the hacker would know for certain that he had entered a valid PIN.

Cryptographic camouflaging avoids this hacker problem by utilizing a plurality of candidate keys, thereby preventing a would-be hacker from knowing when he has found the correct PIN. In addition, hacker detection may be moved off-line into devices accepting messages signed with candidate keys, and/or the lockout threshold may be increased. Thus, the wallet can be forgiving of typographic or transposition errors, yet a hacker trying large numbers of PINs will eventually guess a pseudo-valid (but still incorrect) PIN and recover a candidate private key whose fraudulent use will be detected.

The wallet may be used with associated key generation, certification, and verification technologies. As described by Kausik, various embodiments of the cryptographic camouflaging technique may include pseudo-public keys embedded in pseudo-public certificates—i.e., public keys that are not generally known and which are contained in certificates that are only verifiable by entities authorized by a certifying authority.

It is possible to describe cryptographic camouflaging using the nomenclature of generalized camouflaging. Thus, in Kausik's method for PIN-based protection of a private key, the user must remember the PIN. This PIN corresponds to $O_0$, i.e., a single sub-object (n=1) remembered by the user (and therefore not stored in the wallet). The private key, PrK, corresponds to the secret, S, to be secured. The wallet contains a composition function, $f$, which relates the PIN, $O_0$, to the private key, PrK. The wallet also contains other, unremembered sub-objects, $O_1$ through $O_q$ (where q is an integer greater than or equal to 1), of which $O_1$ through $O_{q-1}$ represent pseudo-valid PINs used to camouflage the secret/password combination, and $O_q$ is a representation of the private key encrypted under the correct PIN.

Any user who has access to the wallet and who knows the PIN, $O_0$, can access or obtain the private key, PrK, from the security system. But consider a user who has access to the wallet and yet does not know the PIN—i.e., an "unauthorized user." Having access to the wallet, the unauthorized user might try to access or obtain PrK from the security system by entering different, but incorrect, values for the PIN. If O* is the PIN tried, he or she will get $f(O^*, O_1, \ldots, O_q)$=PrK*, instead of PrK. The sub-objects are such that $f(O^*, O_1, \ldots, O_q)$ will still return an object of the same kind as PrK, which object will be structurally indistinguishable from PrK but functionally and informationally useless to the unauthorized user. This is achieved by identifying the pseudo-valid PIN $O_1$ equal to O*, and using that PIN as the key to decrypt an encrypted version of the private key, $O_q$, to generate and output a quantity PrK*. Because PrK and PrK* are (by design) the same type of object, there is no way for the unauthorized user to know if a valid password has been entered: the secret private key, PrK, is thus "camouflaged" by generation of the pseudo-secret private key, PrK*.

Figure 3:
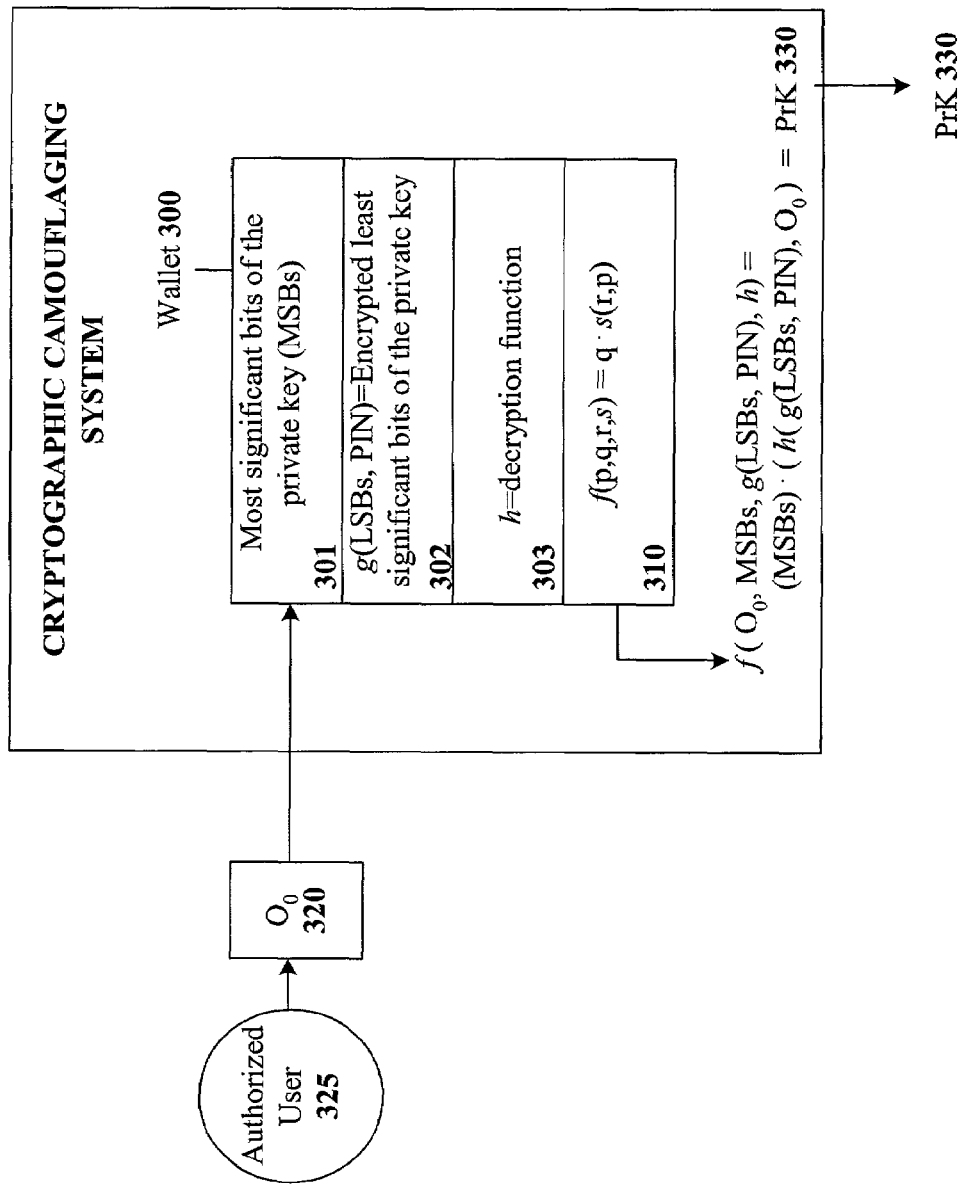
FIG. 3 is a schematic overview of a cryptographic camouflaging embodiment of generalized camouflaging.

Thus, cryptographic camouflaging provides a special case of generalized camouflaging where both the user-entered input, $O_0$ or O*, and the secured private key, PrK, are integers. FIG. 3 illustrates a cryptographic camouflaging embodiment of generalized camouflaging. If, for example, the private key is one of an RSA system, then the sub-objects will be: the user-entered input, $O_0$ or O* 320; a predefined set of the most significant bits of the PrK ("MSBs") 301; g (LSBs,PIN) 302; and h 303. Here, g is an encryption function used to encrypt the remaining, least significant bits of PrK ("LSBs") using the correct PIN, and h is the corresponding decryption function.

In one of Kausik's exemplary embodiments, h is actually a composite function comprising a (pure) decryption function together with a testing function. The (pure) decryption function is simply the complement of g (as appropriate to the particular cryptographic protocol being sued, as understood by those skilled in the art). The testing function allows certain, but not all, user inputted inputs to be passed through. That is, if the user input is one of several pseudo-valid PINs, $O_1$ through $O_{q-1}$ (e.g., as determined by a many-to-one hash test), the input is passed through to h. If not, the input is not passed through (and the system aborts its operation).

In the foregoing example, the composition function, $f$ 310, can be generally described as follows: $f(p, q, r, s)$=q·s(r,p), where "·" is the concatenation operator. The secured private key will thus be regenerated by the system via $f$ 310 when a valid PIN, $O_0$ 320, is entered: $f(O_0, \text{MSBs}, g(\text{LSBs}, \text{PIN}), h)$=MSB·h[g(LSBs, PIN), $O_0$]=MSB·LSB=PrK. In other words, the system first uses decryption function h to decrypt g(LSBs, PIN) 302 with the user supplied input, $O_0$ 320. It then concatenates the MSBs 301, which are stored in the wallet 300, with the decrypted bits. The result of the concatenation, PrK 330, is what the system outputs to the user.

Similarly, a pseudo-secret private key will be regenerated by the system via $f$ 310 when a pseudo-valid PIN, O* 320, is entered: $f(O^*, \text{MSBs}, g(\text{LSBs}, \text{PIN}), h)$=MSB·h[g(LSBs, PIN), O*]=MSB·LSB*=PrK*. In other words, the system first uses decryption function h to decrypt g(LSBs, PIN) 302 with the user supplied input, O* 320 to produce LSBS*. It then concatenates the MSBs 301, which are stored in the wallet 300, with the decrypted bits. The result of the concatenation, PrK* 330, is what the system outputs to the user. This concatenation is structurally similar to the correct PrK, but ineffective as a private key if the user-entered input, $O_0$, is not the correct PIN.

2. THE GENERATION CAMOUFLAGING EMBODIMENT

One specific embodiment of the generalized camouflaging technique is Generation Camouflaging, which is also directed at securing private keys in an encryption scheme. Unlike cryptographic camouflaging, however, generation camouflaging aims at regenerating private keys without storing the private key bit strings, either encrypted or unencrypted. Generation camouflaging is discussed and claimed in a co-pending application, Ser. No. 09/874,795, filed by Hird on Jun. 5, 2001, and incorporated herein by reference.

Generation camouflaging also provides a system that is relatively secure from the kinds of hacker attacks on encrypted data systems which are described by Kausik. As described by Hird, generation camouflaging goes beyond Kausik, in that it does not require the secured objects to be stored in any manner (either encrypted or unencrypted), either within the wallet or in any other component of the system. Those skilled in the art will appreciate that the basic elements of the following discussion are applicable to many other systems as well, both cryptographic and non-cryptographic, where secured and confidential data or information is generated by a special function.

Figure 4A:
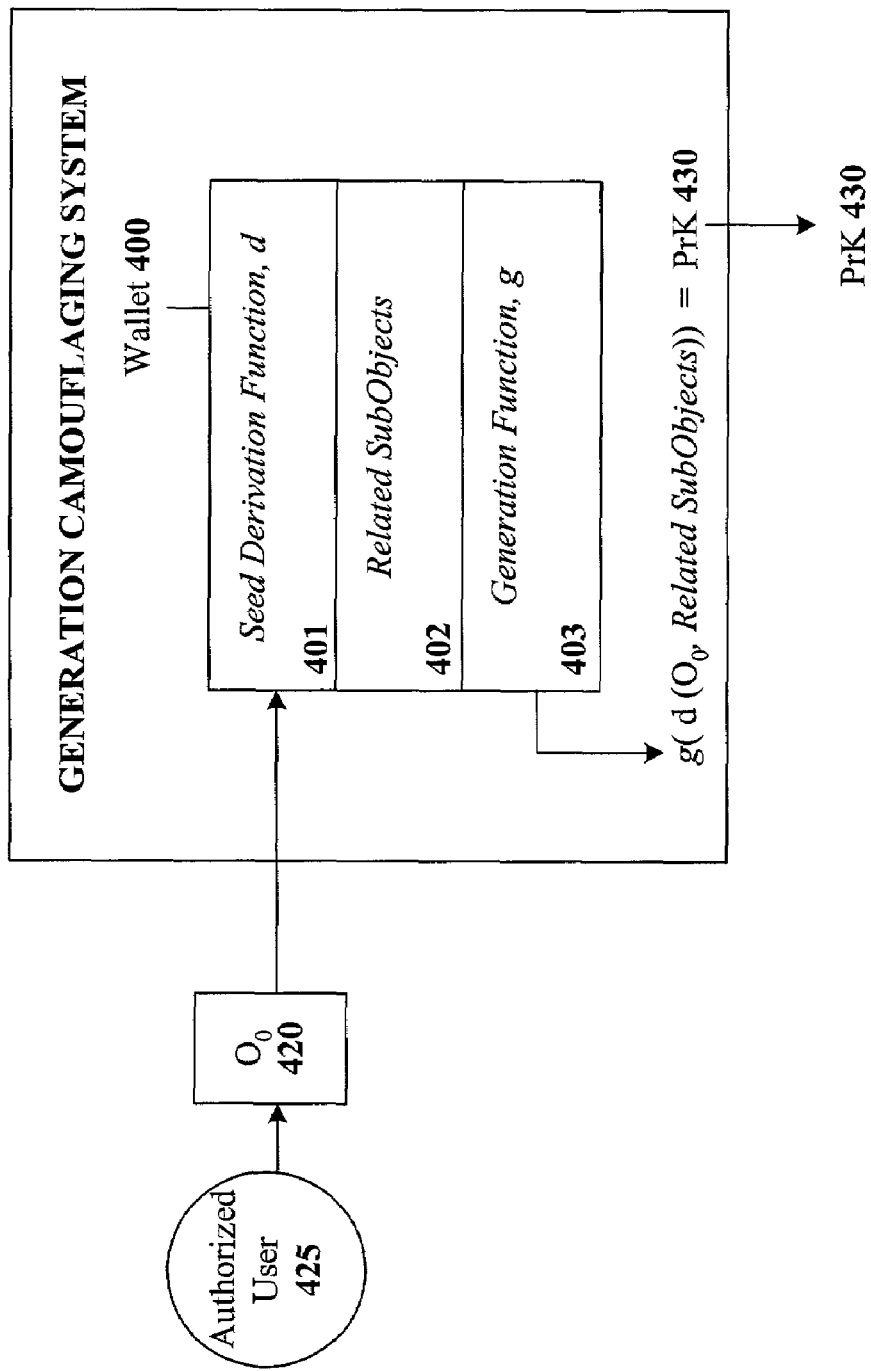
FIG. 4A is a schematic overview of a generation camouflaging embodiment of generalized camouflaging.

FIG. 4A gives a schematic overview of functional elements of the overall system of the cryptographic camouflaging embodiment, each of which plays a role in the secure generation of a private key and its subsequent use. The first component is the key wallet 400, which stores a seed derivation function 401, related sub-objects 402, and a generation function 410 for private key, PrK 430, that is used to create signatures. The seed derivation function 401 generates a seed value for the key generation function 403, which generates the public and private keys for the user.

In particular, a private key (and its corresponding public key, in accordance with a specified relationship between private and public keys appropriate to the particular cryptographic protocol in use) is generated as a function of a seed using known key generation protocols such as those described in Schneier, *Applied Cryptography*, Wiley, 1996 and Menezes, *Handbook of Applied Cryptography*, CRC Press, 1997.

Generally, in the generation camouflaging embodiment of generalized camouflaging, the composition function, $f$, uses the generation function, g, to regenerate the private key, PrK, using the other sub-objects (both user-entered sub-object(s) and those within the key wallet) to reconstruct the seed that was originally used to generate the private key. As described by Hird, in most applications, a user-entered PIN value is used to reconstruct the original seed, and is about 4-6 bytes, which is typically smaller than a standard-sized seed value. However, it is possible that the PIN value may be larger than the seed value. This could be accomplished, for example, by doing a many-to-one hash of the PIN, and using this smaller byte sequence as the seed.

Figure 4B:
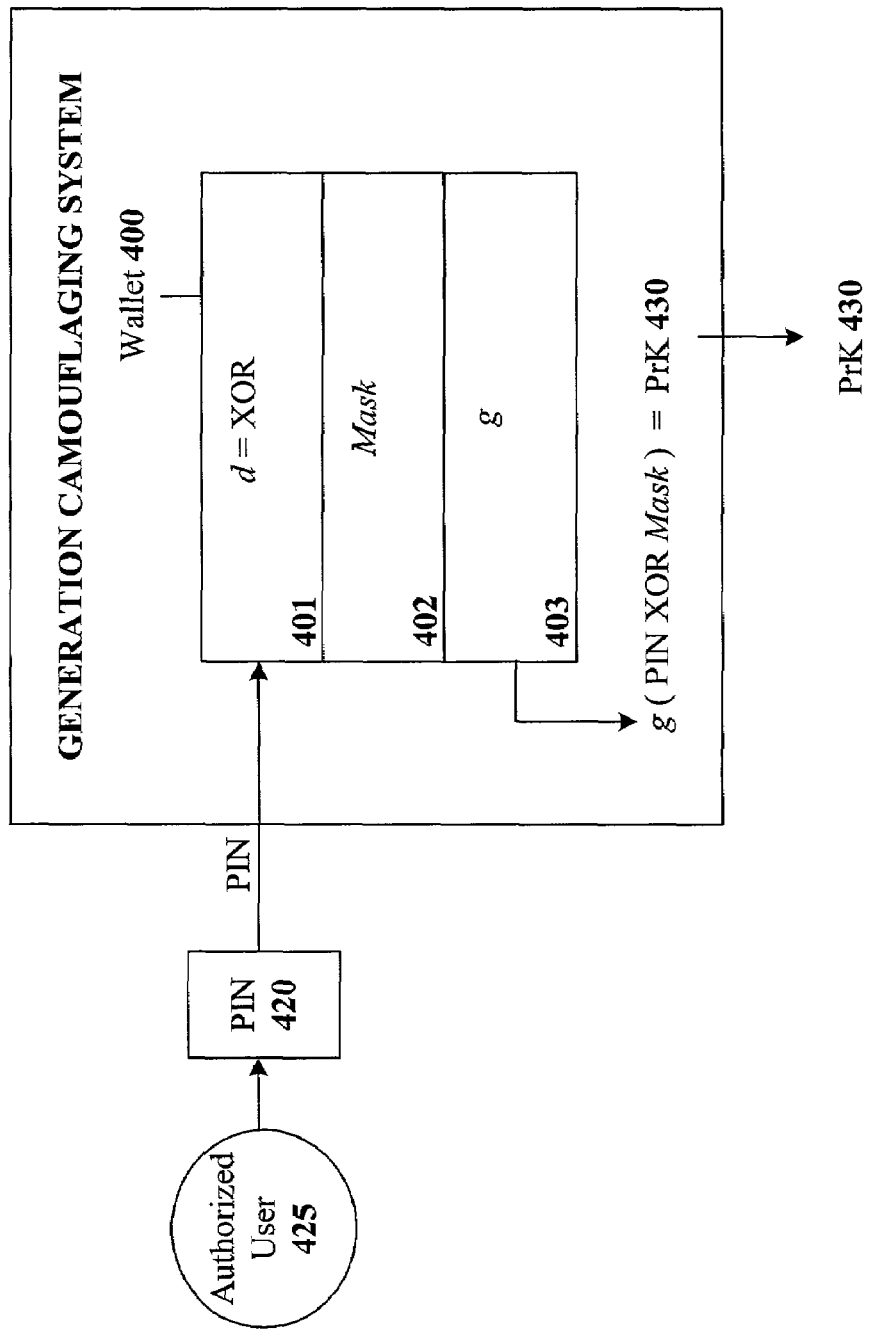
FIG. 4B is a specific embodiment of the system of FIG. 4A.

More specifically, the input seed value to the generation function g may be derived from a PIN 420 that is remembered by a user and which is therefore not stored within the system's wallet. In a specific embodiment, for example, illustrated in FIG. 4B the wallet stores only a mask (which is an integer 402) and two functions: d 401, which is a function used to derive the seed from the PIN 420 and the mask 402; and g 403, which is the generation function. As discussed in Hird, the function d may be the exclusive-OR function ("XOR"); however, in other embodiments, the input seed value may be derived from other types of relationships between the input PIN and any object(s) stored in the wallet. In the case where d is XOR, as in this illustrated example, the data that is secured through camouflaging, PrK 430, is g(PIN XOR mask). In other words, g is a key generation function that takes (PIN XOR mask) as its seed. An authorized user who can access the wallet 400 and who knows the valid PIN will thus be able to regenerate the correct private key. An unauthorized user who can access the wallet but who does not know the valid PIN, however, will generate g(PIN* XOR mask)=PrK* where PIN* is an incorrect guess of the true PIN, and PrK* is a pseudo-key that looks structurally the same as the correct private key, but is functionally useless to the unauthorized user.

Hence, in the above example for generalized camouflaging, the sub-objects are the PIN, the mask, d, and g. The composition function, $f$(not shown), is described in this example as follows: $f(w, x, y, z)=z(y(w, x))$. If the user properly remembers and enters the valid PIN, then the correct secured private key is reproduced by the system:

$f$(PIN, mask, XOR, g)=g(PIN XOR mask)=PrK.

Otherwise, if the user does not know or remember the valid PIN, but enters a guess (PIN*) instead, then a pseudo-key is reproduced:

$f$(PIN*, mask, XOR, g)=g(PIN* XOR mask)=PrK*.

The result, PrK*, is structurally indistinguishable from the true private key, which serves to camouflage the actual private key, and both the PIN and the private key are still unknown to the unauthorized user.

Note that generation camouflaging itself can be generalized in a number of ways. For example, in the above embodiment, instead of storing g, one could store a function that generates g. All such cases are specific embodiments of the generalized camouflaging technique.

3. THE GRAPH CAMOUFLAGING EMBODIMENT

State information concerning a multi-dimensional physical and/or logical system is often most efficiently stored and manipulated if it is first modeled by a graph object before it is represented in a computer memory. A system that easily lends itself to being modeled by a graph object generally comprises a set of nodes and links between the nodes. Those skilled in the art will immediately recognize that a graph object modeling such a system comprises a set of Vertices, where each vertex corresponds to a given node in the system, and a set of Edges, where each edge corresponds to a link in the system. As described below, graph objects are easily represented in a computer through well-known techniques.

For example, consider a public switched network such as the Internet. One graph representing part or all of this system comprises: (a) a set of vertices, in which each vertex represents a switching element in the system; and (b) a set of edges, in which each edge corresponds to a physical connection between two switching elements represented by the vertices. Thus, data and information regarding the status of such a network is represented in graph form. State information of this nature is often quite sensitive and should be secured. Other computer-representable graphs may store, for example, information about the physical and/or logical access network of an Internet Service Provider or telephone company (wired or wireless), the routing network of package delivery company (such as FedEx), the status of a highway, subway, railroad, airline, or other transportation system, the status of a geophysical or other environmental monitoring system, or the configuration of an organization or virtually any other collection of interrelated logical and/or physical entities.

Those skilled in the art will recognize that, as a computer-representable object, a graph G comprises a set of vertices, V, and a set of edges between vertices, E. The set of vertices has at least one member, but the set of edges may in fact be empty, depending upon the actual physical and/or logical entity (e.g., a real-time model of a routing network) G is meant to represent. In addition, G can have a number of general or global attributes (e.g., if E is not empty, then G may be either directed or undirected).

Data and information about a physical and/or logical system can be represented by a graph, and thus stored inside a computer, using a number of different data structures. One well-known type of data structure used for storing data and information in graph form is called an Adjacency Matrix (see, e.g., E. Horowitz, S. Sahni, and S. Rajasekaran, *Computer Algorithms,* W. H. Freeman Press, 1998). Thus, if a graph G has n vertices (corresponding, for example, to n interconnected physical and/or logical elements in a network), then an adjacency matrix M of size n×n may be used to represent G—and therefore the physical system—in a computer memory[1], where each vertex (physical and/or logical element) corresponds to both a row and a column in the matrix. Generally, each adjacency matrix element, M[i] [j], will contain a specified object (for example, the integer zero) if there is no edge (interconnection) connecting graph vertices (physical and/or logical elements) i and j. Otherwise, M[i] [j] will contain an object representing information pertaining to the edge (interconnection)—for example, the integer one, which simply indicates the edge's existence—and perhaps information about the vertices (physical and/or logical elements) i and j as well. For example, M[i] [j] could contain the length of the link (in meters) connecting vertices i and j in a telephone network.

[1] Depending on whether an implementation is in software, hardware, or a combination thereof, the memory might be a data structure or other type of software memory, a ROM, RAM or other type of physical memory, or some combination thereof.

Figure 5:
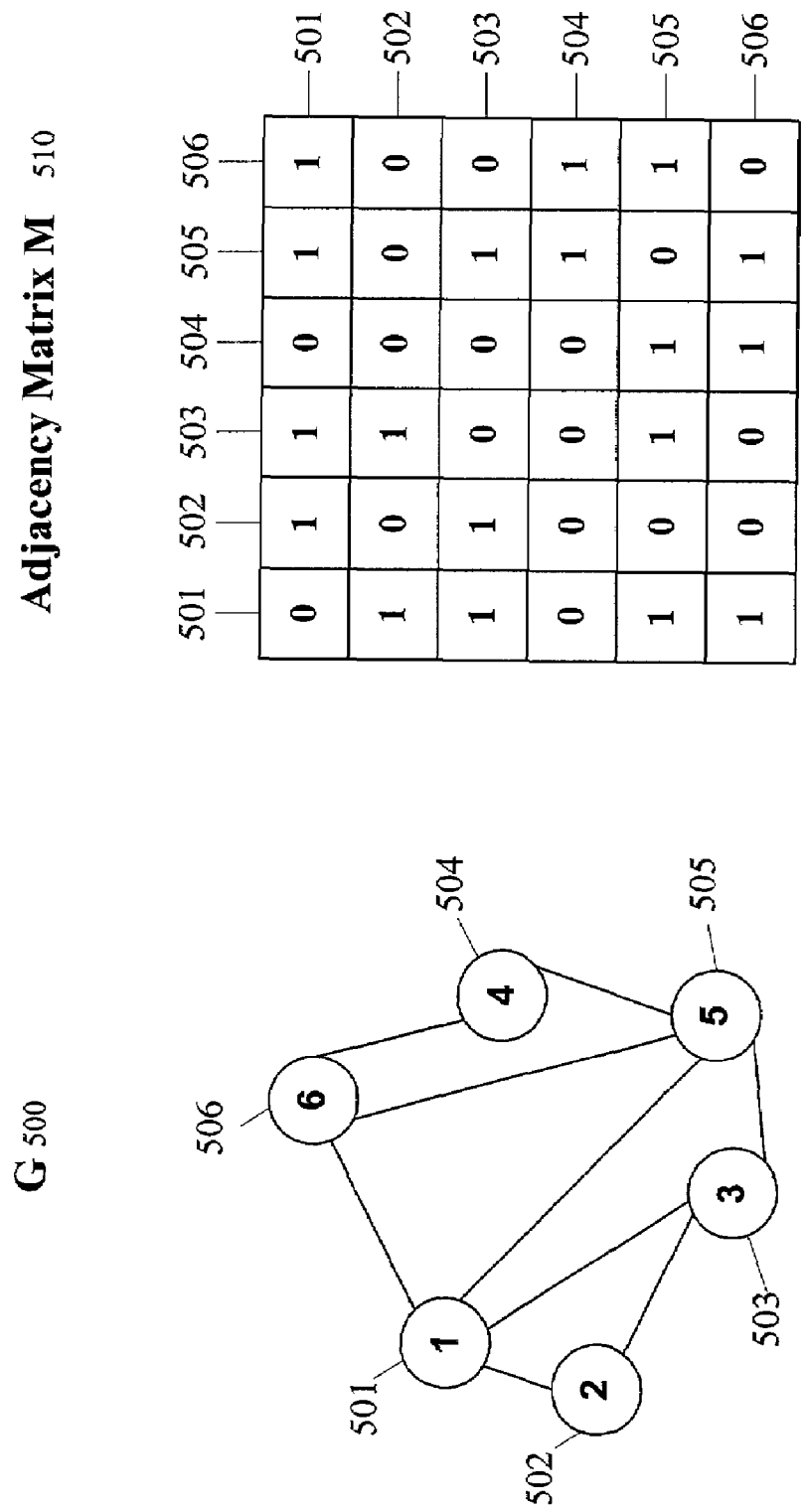
FIG. 5 depicts an example graph model representation (and associated matrix data structure) of a physical and/or logical system.

To illustrate this form of computerized representation of a physical and/or logical system, for example, FIG. 5 shows a graph G 500, which comprises six vertices (501, 502, 503, 504, 505, 506), each vertex corresponding to a switching element in a public switched network, and nine edges, each edge corresponding to a real-time interconnection between two switching elements. (In this figure, G is a connected graph, but it does not necessarily have to be.) An adjacency matrix, M 510, stores the information about the public switched network, and thus the graph G that models the network, in computer-representable form. In this illustration, the adjacency matrix M 510 has six rows and six columns, where each row and each column correspond to one distinct vertex (switching element) of the graph (public switched network).

Given that a multi-dimensional system can be represented as a graph object in a computer memory by using an adjacency matrix data structure, one embodiment of generalized camouflaging provides a method and apparatus for camouflaging a graph, described below.

Figure 6:
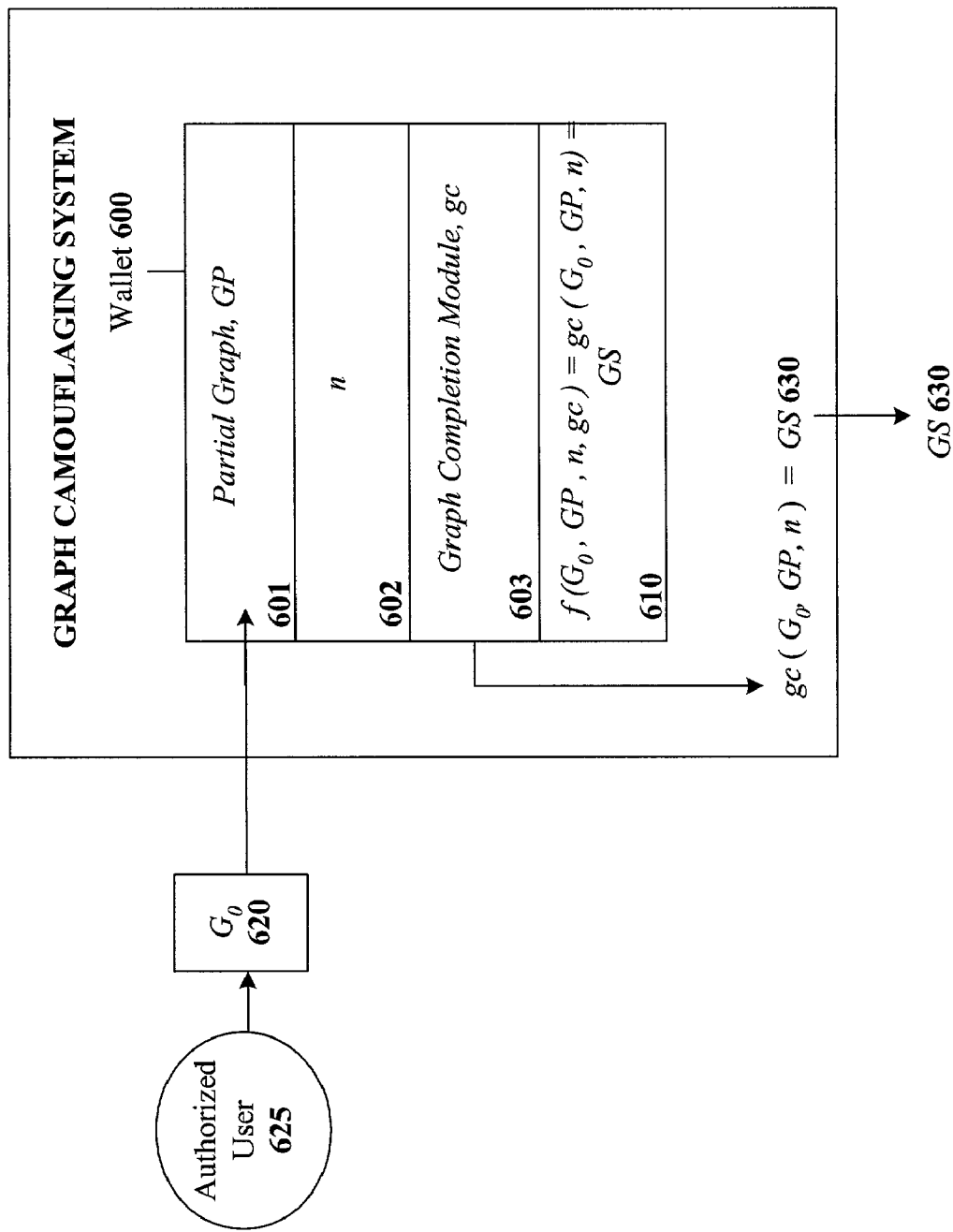
FIG. 6 is a schematic overview of a graph camouflaging embodiment of generalized camouflaging.

FIG. 6 gives a schematic overview of the functional elements of an exemplary graph camouflaging system, which is another embodiment of the generalized camouflaging system called Graph Camouflage. In an exemplary graph camouflaging system, the wallet 600 stores a partial graph, GP 601, related sub-objects 602, and a graph completion module, gc 603. The graph completion module 610 transforms the partial graph into a secret graph, GS 630. The secret graph is to be secured through camouflaging, and generally represents data and/or information regarding a physical and/or logical system modeled by the graph. A user 625, has a Complementary Graph, $G_0$ 620, which he or she causes to be entered (either directly or indirectly) as the password into the system. This complementary graph, $G_0$ 620, is then used in conjunction with the stored partial graph, GP 601, and related sub-objects 602, by the graph completion module, gc 603, which reconstructs the secret graph GS 630 by operating on the partial and complementary graphs. If the user causes an incorrect graph to be entered, G*, then the graph camouflaging system will reconstruct a different graph, GS*, and the actual secret graph, GS, including the information it contains about the physical and/or logical system it represents, remains secured. As in the other embodiments of generalized camouflaging, the outputted quantity (here, graph GS*) can be meaningless, random, fixed, or pseudo-valid (the latter indicating a capability to fool an attacker into thinking that a valid result has been obtained).

As an illustration of graph camouflaging, consider a physical system of n interconnected elements modeled by an undirected graph. A graph is said to be undirected if M[i] [j]=M[j] [i] for all nodes i and j. In this example, GS 630, representing data and information about the physical system, is not stored within the system. Rather, GS has been initially partitioned into two subgraphs: $G_0$ 620, which need not be stored in the wallet, and GP 601, which is stored in the wallet in the form of an adjacency matrix data structure. One method of partitioning the graph, GS, is by the following:

Step (1): Construct the n×n adjacency matrix, M, containing the information about GS (and, therefore, the physical system) to be secured.

Step (2): Select one or more rows of the adjacency matrix, M. The number of rows selected must be less than the total number of rows (i.e., vertices in GS, hence elements in the physical system modeled thereby), n. For example, the number of rows selected can be an integer derived from log(n)or $\sqrt{n}$ or any other protocol known to those skilled in the art. Because each row maps to a unique vertex identifier, selecting a row means selecting a graph vertex that may be uniquely identified by an integer between 1 and n (inclusive). In an exemplary embodiment, rows are selected at random; alternatively, a given row may be selected from an integer function of n, or any other method of row selection may be used.

Step (3): Store in the wallet 600 the total number of physical system elements, n, which defines the size of the adjacency matrix, M (n is therefore one of the related sub-object 602).

Step (4): Delete the content of the rows selected in Step (2) from M. In addition, delete the content of the columns having the same integer identifiers as the rows deleted. This deletion step has the effect of removing vertices from the secret graph, GS, represented by M: If $(r_1, r_2, \ldots, r_k)$ and $(c_1, c_2, \ldots, c_k)$ are the rows and columns (respectively) selected in Step (2) and deleted in this Step (4), then the vertices $\{1, 2, \ldots, k\}$ have been deleted from the secret graph, GS. GP is the sub-graph of GS that results after deleting these vertices.

Step (5): Store the sub-graph, GP 601, in, for example, row-major order within the wallet 600.

Step (6): The content of the integer identifiers (or indexes) for the rows (and columns) deleted, along with the rows (and columns) deleted, form the complementary graph, $G_0$ 620. (Actually, since GS is an undirected graph, the complementary graph need only store the deleted row identifiers and row content, since the matrix M is symmetric. If GS were directed, the complementary graph would include both the deleted row and column information). Any format can be used for the storage of GS, for example, deleted identifiers, followed by a non-numeric or other means of demarcation, followed by the deleted content. The complementary graph need not be stored within the wallet, but can be distributed or otherwise made accessible to a user 625 of the system via, for example, a smart card or other external, portable memory device. Where the information that comprises the password, $G_0$, is too large or otherwise inconvenient for an individual user to remember, an external, portable memory device, such as a smart card may be used to store the complementary graph. In a form of multi-level camouflaging, the smart card may itself be protected by a PIN, using the camouflaging methods of Kausik, Hird, those additionally disclosed herein (e.g., graph or Boolean camouflaging), or any other camouflaging scheme known to those skilled in the art. The choice of whether or not to have a PIN, and the protection scheme therefore, depends on the engineering choices and security needs of the particular system in question. Such multi-level camouflaging is, of course, equally applicable to the other embodiments of generalized camouflaging described herein, and may comprise multiple applications of the same type of camouflaging embodiment, as well as applications of different embodiments at different levels.

In an exemplary embodiment of graph camouflaging, once the secret graph, GS, has been partitioned into complementary and partial graphs (typically stored separately), the system secures the data and information in GS, and therefore of the physical system that the graph represents, in the following manner.

A user desiring access to GS would enter (or cause to be entered) the complementary graph $G_0$. For example, if the complementary graph has been stored on a PIN-protected smart card, then the user would insert this smart card into a reader device and enter a PIN. If the PIN is correct, the smart card will allow the correct complementary graph, $G_0$, to be read off the card; if the PIN is incorrect, then the smart card will cause an incorrect, "dummy" graph, G* to be read. The dummy graph is either stored directly on the card, or it may be generated by the card if the card possesses processing capabilities.

The complementary (or dummy) graph is thus entered into the system. The generalized camouflaging system produces an output graph from the partial graph, GP, which is stored in the wallet and the user-entered graph, using a graph completion module, gc, which has also been stored in the wallet. The output graph could be made available to the user in a number of ways. It could be displayed on the screen (using graph drawing programs), it could be written on a computer-readable medium (such as a floppy disk, CD, etc.), it could be sent to a printer, it could be sent to an application program that processes it further to retrieve relevant information from the graph, or it could be processed in still other ways known to those skilled in the art. In this example, where the partial graph, GP, and the complementary graph, $G_0$, have been generated by the method outlined above (i.e., by removal of row content from the secret graph, GS), then the graph completion module constructs a graph from $G_0$ and GP by: (a) generating an n×n matrix M and initializing all the entries to zero; and (b) filling in the correct values for the rows (and columns) stored in the wallet from the complementary graph $G_0$ (for example, if rows and columns 5 and 7 are in the wallet and the graph is undirected, rows and columns 5 and 7 of M will be filled with the appropriate values stored in the wallet); and (c) filling the rest of the values of M with the corresponding values in GP. The foregoing describes one exemplary technique for combining the complementary and partial graphs; many other well known techniques for combining two matrices are known to those skilled in the art, and need not be described herein.

Thus, in the above example for generalized camouflaging, the sub-objects are the user-entered complementary graph, $G_0$ 620 (which comprises both the content and the integer identifiers for the rows deleted), the partial graph, GP 601, n 602, and gc 603. The composition function,[2] $f$ 610, is described in this example as follows: $f(w, x, y, z)=z(x, y, w)$. If the user properly remembers and enters the correct complementary graph $G_0$ (via, for example, the smart card method described above), then the correct secured graph, GS, is reproduced and output by the system:

$$f(G_0, GP, n, gc)=gc(G_0, GP, n)=GS.$$

[2] The composition function is the inverse or complement of a decomposition module initially used to decompose the graph into the partial graph and complementary graph. Those skilled in the art will readily appreciate that many different implementations of decomposition modules are possible using well-known techniques of computer matrix manipulation, including without limitation, those disclosed in the foregoing paragraph.

Otherwise, if the user does not remember or cause to be entered the correct Complementary graph, but instead causes to be entered a dummy or otherwise bogus Graph, G* instead, then a pseudo-graph is reproduced and output by the system:

$$f(G^*, GP, n, gc)=gc(G^*, GP, n)=GS^*.$$

The foregoing illustrates a graph addition process. Other aspects of a graph Camouflaging system may use different methods for partitioning the secret graph, GS. For example, information about a physical system can be secured through graph Camouflaging if the system is modeled by a graph that can represented as the product of two graphs, one of which is treated as the complementary graph, $G_0$, the other of which is a sub-graph, GP, and is stored in the wallet. In this example, the user enters (or causes to be entered) an input graph. The graph camouflaging system performs a graph product operation on the input graph and the partial graph stored in the wallet. If the input graph is correct, the system properly generates and outputs the secured graph, GS; otherwise, a plausible (but informationally empty) graph, GS*, is output to the user. In general, then, any graph decomposition process known to those skilled in the art can be used in connection with graph camouflaging.

Those skilled in the art will recognize that graph camouflaging can be modified in a number of ways. For example, any number of partial graphs may be used. In addition, the operation to be performed on the partial graphs—i.e., the graph composition module, gc—can also be chosen in different ways, depending upon the nature of the secret graph, GS.

4. THE BOOLEAN FUNCTION CAMOUFLAGE EMBODIMENT

Yet another embodiment of the generalized camouflaging technique is that of camouflaging the data and information in a decision-making system, in which data and information is most conveniently modeled by Boolean functions. For example, computerized expert systems make decisions based upon a complex combination of propositional states of Boolean variables defined by the system's known parameters. Protecting the information in an expert system can be accomplished by using one embodiment called Boolean Camouflaging. Boolean camouflaging is useful for any system that can be modeled using Boolean functions.

It is well known in the art that a Boolean function can be represented within a computer using a matrix data structure. A matrix can be used to store the truth table that describes the output of Boolean function, and thus the behavior of the decision-making system being modeled by that Boolean function (i.e., the state information of the system). Thus, if a Boolean function, F, has n Boolean variables (corresponding, for example, to n independent propositional states for the system), then a matrix data structure, M, of size $2^n \times (n+1)$ may be used to represent F—and therefore the decision-making system—in a computer memory, where: (a) each Boolean variable (propositional state) corresponds to one column in the matrix; (b) F corresponds to the last column in the matrix; and (c) each row corresponds to a unique combination of Boolean values for the Boolean variables, represented by a unique n-bit string. For example, one skilled in the art will recognize that the conventional first row of a truth table will contain the bit-string $(0,0,0, \ldots, 0, F(0,0,0, \ldots, 0))$, the second row will contain the bit string $(0,0,0, \ldots, 1, F(0,0,0, \ldots, 1))$, the third row will contain $(0,0,0, \ldots, 1,0, F(0,0,0 \ldots, 1,0))$—etc.—and the last row will contain the bit string $(1,1,1, \ldots, 1, F(1,1,1, \ldots, 1))$.

As an illustration, assume that a decision-making system is modeled by a Boolean function that makes decisions based upon four Boolean variables, $x_1, x_2, x_3$, and $x_4$. Such a system may, for example, relate to an expert geological system, where a decision to drill for oil depends upon four independent conditions, e.g., the system will recommend drilling if: (1) the terrain does not lie adjacent to a major volcanic plume (NOT $x_1$); (2) the composition of the terrain lies within a certain percentage range of limestone ($x_2$); (3) the terrain falls within a mathematically-defined, statistical set of parameters pertaining to the location of the terrain relative to known oil fields ($x_3$); and (4) there has been no seismic activity within the boundaries of the terrain within the past 150,000 years (NOT $x_4$). The only bit string representing this set of conditions and the recommendation for drilling is (0,1,1,0,1), where the first four bits are the Boolean values corresponding to the above propositional state variables and the fifth bit corresponds to the value of the Boolean function (in this example, 1) that models the expert geological system. In this example, all other combinations of $x_1, x_2, x_3$ and $x_4$ correspond to a value of F equals zero.

Turning now to a slightly more complicated example, FIG. 7 illustrates how a complete truth table is set up for decision-making process modeled by a Boolean function, for example, the function $F(x_1, x_2, x_3, x_4)=(x_2 \text{ OR } x_3) \text{ AND } ((\text{NOT } x_3) \text{ OR } x_4 \text{ OR } (\text{NOT } x_1))$. Those skilled in the art will recognize that, generally, the order of the bit strings for the Boolean variables (propositional variables) within a truth table (expert system) is conventional—here, for example, each row contains a unique combination of bits for the four variables (the first row containing (0000), the last row containing (1111) the rows ordered incrementally), for a total of $2^4=16$ rows in the table. The final bit for each row in the table contains the Boolean function value, $F(x_1, x_2, x_3, x_4)$. This truth table may be directly stored within a computer memory using, for example, a two-dimensional matrix, M, (here, having size $2^4 \times 5$). Of course, the ordering by value of $x_1, x_2, x_3, x_4$ in the foregoing truth tables is arbitrary, and could be replaced with any other convention—or even no convention at all since the table itself carries the values of the propositional states. But where a convention is used, a more economical way of representing such a table is by simply storing just the last column of the truth table, F, since the first n-bits within each row are understood to be ordered by value in accordance with a standard protocol. Thus, in a particularly space-efficient embodiment, a Boolean function of n variables can be represented as a bit array (i.e., a one-dimensional matrix) of size $2^n$, where n is the number of propositional variables upon which the Boolean function depends.

Given that a multi-dimensional decision-making system can be represented (at least in part) by a Boolean function object in a computer memory using a truth table, and corresponding to an array data structure (i.e., a one-dimensional matrix), one embodiment of generalized camouflaging provides for camouflaging a Boolean function, as described below. Although the following exemplary embodiment uses the term "array" with reference to a matrix of size $1 \times n$ (or $n \times 1$), those skilled in the art will readily appreciate how to apply the teachings of this exemplary embodiment to any other embodiment using a matrix generally (i.e., of size m×n). In such an embodiment, the term "array" should be understood to encompass a column or row of the matrix.

Figure 8:
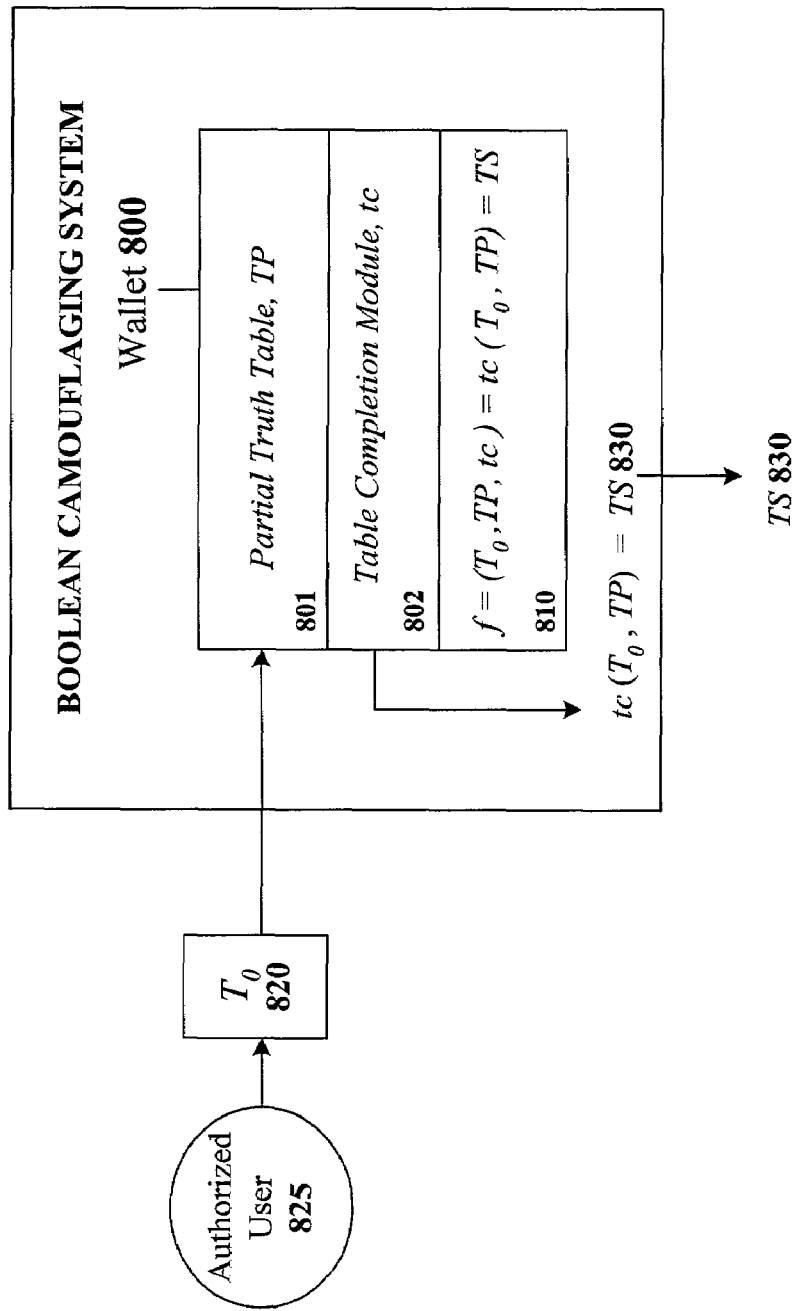
FIG. 8 is a schematic overview of a Boolean function camouflaging embodiment of generalized camouflaging.

FIG. 8 gives a schematic overview of the functional elements of an exemplary Boolean camouflaging system. In an exemplary Boolean camouflaging system, the wallet 800 stores a partial truth table, TP 801, and a table completion module, tc 802, for transforming the partial table into the secret table, TS 830. The secret table is to be secured through camouflaging, and generally represents a decision-making model for a decision-making (expert) system, represented by a Boolean function. Here again the output of the system can be presented to the user in a number of ways: via computer monitor, via printed expression, via a program that encodes the expression and is able to compute the value of the expression on any input set of values for the variables, etc.

A user 825, has a complementary array, $T_0$ 820, which he or she causes to be entered (either directly or indirectly) as the password into the system. This complementary array, $T_0$ 820, is then used in conjunction with the stored partial table, TP 801, by the table completion module[3], tc 802, which reconstructs the secret table TS 830 by operating on the partial table and the input complementary array. If the user causes an incorrect complementary array, T*, to be entered, then the Boolean camouflaging system will reconstruct and output a different, yet meaningless truth table, TS*, and the actual secret truth table, TS, including the information it contains about the decision-making system it represents, remains secured.

[3] The table completion module is the inverse or complement of a decomposition module initially used to decompose the secret table into the partial truth table and complementary array. Those skilled in the art will readily appreciate that many different implementations of decomposition modules are possible using well-known techniques of computer matrix manipulation, including without limitation, the exemplary techniques disclosed with respect to graph camouflaging, above.

As an illustration, consider an exemplary wallet for use in a Boolean camouflaging system, in which a decision-making system is modeled by n propositional states, hence n Boolean variables. In this embodiment, TS 830, representing the decision-making system's truth table (or state information) in the form of a bit array, is not stored within the system. Rather, TS has been initially partitioned into two subarrays: $T_0$, 820 which need not be stored in the wallet, and TP 801, which is stored in the wallet. One method of partitioning the table, TS 830, is analogous to the partitioning process used in graph camouflaging, i.e.:

Step (1): Construct the $2^n$ bit array, TS, containing the information about the Boolean function (and, therefore, the decision-making system) to be secured.

Step (2): Select one or more elements of TS. The number of elements selected must be less than the total number of elements, $2^n$. For example, the number of elements selected can be an integer derived from $\log(n)$ or $\sqrt{n}$ or any other protocol known to those skilled in the art. In an exemplary embodiment, the elements are selected at random; alternatively, a given element may be selected from an integer function of n, or by any other technique.

Step (3): Delete the elements (or simply the content thereof) selected in Step (2) from TS. TP 801 is the partial truth table of TS that results after deleting these elements.

Step (4): Store the partial truth table, TP, in the wallet.

Step (5): The content of the elements deleted in Step (2), along with the array positions of those elements, comprise the complementary array, $T_0$ 820. The complementary array need not be stored within the wallet, but can be distributed or otherwise made accessible to a user 825 of the system via, for example, a smart card or other external, portable memory device.

In the exemplary embodiments, once the secret Boolean function (or its state information) represented by the truth table array, TS, has been partitioned, and the partial and complementary arrays stored separately, generalized camouflaging secures the data and information in TS, and therefore of the decision-making system that TS represents, in the following manner.

A user desiring access to TS would enter (or cause to be entered) the complementary array $T_0$. Because the information that comprises the complementary array (password), $T_0$, may also be too large for an individual user to remember, an external, portable memory device, such as a smart card (with or without a PIN), is preferably used to store the complementary array. Thus, for example, if the complementary array has been stored on a PIN-protected smart card, then the user would insert this smart card into a reader device and enter a PIN. If the PIN is correct, the smart card will allow the correct complementary array, $T_0$, to be read off the card; if the PIN is incorrect, then the smart card will cause an incorrect, "dummy" array, T* to be read. As in the other embodiments of generalized camouflaging, the dummy array can be meaningless, random, fixed, or pseudo-valid (the latter indicating a capability to fool an attacker into thinking that a valid result has been obtained). The dummy array is either stored directly on the card, or it may also be generated by the card if the card possesses processing capabilities.

The complementary (or dummy) array is thus entered into the system. The generalized camouflaging system produces an output truth table from the partial array stored in the wallet, TP 801, and the user-entered array 802 (which includes the positions of the elements removed from TS), using a table completion module, tc 802, which has also been stored in the wallet 800. The output of the system can be presented to the user in a number of ways: via computer monitor, via printed expression, via a program that encodes the expression, and is able to compute the value of the expression on any input set of values for the variables, etc.

In this example, where the partial truth table, TP 801, and the complementary array, $T_0$ 820, have been generated by the method outlined above (i.e., by removal of elements from the secret table, TS), then the table completion module, tc 802, constructs a truth table from $T_0$ and TP using the following method: for each element removed from TS, (a) locate the insertion point in TP at which an element is to be inserted; and (b) insert the element content, corresponding to each insertion point, from successive bits in the complementary array, $T_0$. The foregoing describes one exemplary technique for combining the complementary and partial arrays; many other well known techniques for combining two arrays are known to those skilled in the art, and need not be described herein.

Hence, in the above example for generalized camouflaging, the sub-objects are the user-entered complementary array, $T_0$ 820 (which comprises both the content and the integer identifiers for the elements deleted), the partial truth table, TP 801, and tc 802. The composition function, $f$ 810, is described in this example as follows: $f(x,y,z)=z(x,y)$. If the user properly remembers and enters the correct complementary array $T_0$ (via, for example, the smart card method described above), then the correct secured table, TS 830, is reproduced and output by the system:

$$f(T_0, TP, tc) = tc(T_0, TP) = TS.$$

Otherwise, if the user does not remember or cause to be entered the correct complementary array, but instead causes to be entered a dummy or otherwise bogus graph, T*, instead, then a pseudo-table is reproduced and output by the system:

$$f(T^*, TP, tc) = tc(P, TP) = TS^*.$$

5. FURTHER EMBODIMENTS

The foregoing has described various applications of generalized camouflaging, directed towards securing a variety of computer-representable objects, such as cryptographic keys, dynamic systems modeled by computer-representable graphs, and decision-making systems modeled by computer-representable Boolean functions. Each of these object types has been described in detail as specific examples of generalized camouflaging which, should, be understood to include not only these specific examples, but also many alternative embodiments which will be apparent to those skilled in the art. The breadth and scope of generalized camouflaging is most readily demonstrated in accordance with the following, which shows that any quantity that can be represented digitally can be camouflaged using either the graph or Boolean camouflaging embodiments. We will show below that the given data can be thought of as a Boolean function or a graph and the Boolean or graph camouflaging technique can be used to protect it.

a. Protecting any Discrete Quantity using Boolean Camouflaging

Without loss of generality, assume that the quantity to be protected is a string of zeros and ones of length n. Then we can represent the quantity as a Boolean function as follows. Recall from the description of Boolean camouflaging above, that a Boolean function on k variables can be represented in a space-efficient embodiment with a bit array of size $2^k$. If n is an integral power of , then the quantity to be protected naturally represents one possible state of a Boolean function on $\log_2 n$ variables. If n is not an integral power of 2, we can append the data with an appropriate number of bits until an integral power of 2 is obtained, and the resultant bit sequence will represent a Boolean function on $\lceil \log_2 n \rceil$ variables.

Alternatively, in another embodiment, the quantity to be protected can be expressed as the particular row (or rows) of the truth table in which the particular values of $x_1, x_2, \ldots, x_n$ match the quantity to be protected, with identification of this row being indicated by a special value of the last column entry, F, for this row as compared to the other rows. That is, instead of using the column F to represent the quantity to be protected, we use one (or more) of the rows representing possible values of operands for F. We may regard either of these embodiments as using an array to represent the quantity to be protected—in the first case, a array per se, and in the second case, an array as part of a larger matrix. Where such a matrix is used, it can also be used to simultaneously camouflage different quantities to be protected, provided those quantities can be expressed as different propositional states of a Boolean function.

Having thus represented the quantity to be protected as one of the possible states of the Boolean function, we can protect that quantity using the Boolean camouflaging techniques described earlier. Those skilled in the art will also realize that, although the foregoing uses base 2 arithmetic, the technique is readily applicable to quantities in any other base (including, for example, a 26-base system such as the English alphabet), say base k, by expressing the quantity to be protected as one possible state of a Boolean function of $\log_k n$ variables. Alternatively, one could simply assign each element of the other base a unique base 2 equivalent (e.g., in the base 26 case of the English alphabet, a=00001, b=00010, . . . , z=11010) and proceed with base 2 operations.

b. Protecting any Discrete Quantity using Graph Camouflaging

Similarly, any graph of k vertices can be represented as an adjacency matrix of size k×k. If we arrange the elements of this matrix in row-major order, then we get a bit-array of size $k^2$. In other words, a graph of k vertices can be represented as a bit-array of size $k^2$. Thus if the quantity to be protected has n bits and if n is a perfect square, then the quantity to be protected naturally corresponds to a graph of $\sqrt{n}$ vertices. If n is not a perfect square, then we can append the quantity to be protected with an appropriate number of bits until we get a graph of $\lceil\sqrt{n}\rceil$-vertices. In such a graph, the quantity to be protected is expressed as the contents of the adjacency matrix, in accordance with any desired convention. In a space-efficient implementation, the matrix contains no more elements than is necessary to contain the quantity to be protected (with any necessary padding), stored in row- or column-major fashion. In other implementations, only one (or more) row(s) or column(s) of the matrix could be used, with the other row(s) or column(s) being filled with other data. The identifier of the row(s) or column(s) containing the quantity to be protected could be identified by a predetermined element of the matrix (for example and without limitation, by coding such identifier into the first row), or it could be fixed and known to the system without being coding into the matrix. Once the quantity to be protected is thus modeled as a graph, we can then employ the graph camouflaging embodiment to protect the quantity.

The foregoing illustrates that the techniques disclosed herein are usable generally for securing, through camouflaging, any form of computer-representable object that carries or represents data, information, or instructions for executing functional transformations which are intended to remain secured and protected from unauthorized use or access.

C. Hardware and Software Embodiments

In addition, although the exemplary embodiments have been described with respect to a software-based system, this is not strictly necessary. For example, some or all of the generalized camouflaging elements can be deployed using microcode and PLAs or ROMs, general purpose programming languages and general purpose microprocessors, or ASICs. That is, generalized camouflaging is not limited to software per se, but can also be deployed in virtually any form of computer logic instructions, including pure software, a combination of software and hardware, or even hardware alone. Thus, depending on whether an implementation is in software, hardware, or a combination thereof, the computer-readable media and memories containing the computer logic instructions with which the various embodiments are implemented could include data structures or other types of software structures, a disk, ROM, RAM or other type of physical structures, or some combination thereof.

Therefore, in light of all the foregoing, it is intended that the scope of the invention be limited only by the claims appended below.

What is claimed is:

1. A method for operating an access control system to camouflage a secret so as to be accessible by an authorized user yet protected against unauthorized access, said method comprising the steps of:
   (a) representing in digital form a secret to be protected against unauthorized access;
   (b) storing a plurality of computer-represented objects related to said secret;
      (i) at least one of said objects being accessible by an authorized user as a password;
      (ii) at least another of said objects being stored in a computer-readable wallet accessible to said access control system; and
   (c) representing said secret as a function of said plurality of objects, using a composition function; and
   (d) storing, in a computer-readable memory, said composition function:
      (i) in a manner accessible to said access control system;
      (ii) so as to be executable to generate a candidate secret using a user-inputted candidate password in conjunction with at least said another object stored in said wallet;
      (iii) wherein said candidate secret comprises a pseudo-valid secret configured to camouflage said secret if said candidate password is not said password; and
      (iv) wherein said candidate secret comprises said secret if said candidate password is said password;
   thereby protecting said secret against unauthorized access by camouflaging the secret from persons not having said password.

2. The method of claim 1 further comprising effecting a multilevel camouflaging scheme by camouflaging said at least another object stored in said wallet.

3. The method of claim 1 where:
   (a) said secret represents linkage information among nodes of a network;
   (b) said object accessible by an authorized user is a first graph representing at least a portion of said linkage information; and
   (c) said object stored in said wallet is a second graph representing at least a portion of said linkage information; and
   (d) said composition function accepts as operands at least said first and second graphs.

4. The method of claim 1 where:
   (a) said secret represents at least one possible state of a system expressible as a Boolean logic function;
   (b) said object accessible by an authorized user is a first matrix representing at least one of said states of said Boolean function;
   (c) said object stored in said wallet is a second matrix representing at least one of said states of said Boolean function; and
   (d) said composition function accepts as operands at least said first and second matrices.

5. The method of claim 1 where:
   (i) said secret is a private key of said user;
   (ii) said object accessible by said user is a PIN of said user;
   (iii) said another object stored in said wallet is a pseudo-valid PIN; and
   (iv) said candidate secret has the structural form of a private key.

6. A method for operating an access control system to release a secret camouflaged to be accessible to an authorized user yet protected against unauthorized access, said method comprising the steps of:
   (a) accessing a plurality of computer-represented objects related to a secret;
      (i) at least one of said objects being accessible by an authorized user as a password;
      (ii) at least another of said objects being stored in a computer-readable wallet accessible to said access control system; and
   (b) accessing a composition function representing said secret as a function of said plurality of objects;
   (c) receiving a candidate password inputted by a user;
   (d) generating a candidate secret for said user by executing said composition function using as operands thereto said candidate password in conjunction with at least said another object stored in said wallet;
      (i) wherein said candidate secret comprises a pseudo-valid secret configured to camouflage said secret if said candidate password is not said password;
      (ii) wherein said candidate secret comprises said secret if said candidate password is said password; and
   (e) outputting said candidate secret to said user of said access control system.

7. The method of claim 6 where in said step (d)(i) said pseudo-valid secret is configured to deceive an unauthorized user into believing that said pseudo-valid secret is said secret.

8. The method of claim 6 where:
   (a) said secret represents linkage information among nodes of a network;
   (b) said object accessible by an authorized user is a first graph representing at least a portion of said linkage information;
   (c) said object stored in said wallet is a second graph representing at least a portion of said linkage information; and
   (d) said composition function accepts as operands at least said first and second graphs.

9. The method of claim 6 where:
   (a) said secret represents at least one possible state of a system expressible as a Boolean logic function;
   (b) said object accessible by an authorized user is a first array representing at least one of said states of said Boolean function; and
   (c) said object stored in said wallet is a second array representing at least another of said states of said Boolean function; and
   (d) said composition function accepts as operands at least said first and second arrays.

10. The method of claim 6 where:
   (i) said secret is a private key of said user;
   (ii) said object accessible by said user is a PIN of said user;
   (iii) said another object stored in said wallet is a pseudo-valid PIN; and (iv) said candidate secret has the structural form of a private key.

11. A method for operating an access control system to protect state information against unauthorized access, said method comprising the steps of:
    (a) obtaining state information represented in digital form;
    (b) deriving from said state information a first matrix;
    (c) storing said first matrix as a password usable by an authorized user;
    (d) deriving from said state information a second matrix;
    (e) storing said second matrix in a computer-readable wallet accessible to said access control system; and
    (f) storing, in a computer-readable memory, a composition function executable to generate a candidate matrix using a user-inputted candidate password in conjunction with said second matrix;
        (i) wherein said candidate matrix comprises a pseudo-valid matrix configured to camouflage said matrix if said candidate password is not said password; and
        (ii) wherein said candidate matrix comprises said matrix if said candidate password is said password;
        thereby protecting said state information against unauthorized access by camouflaging said matrix from persons not having said password.

12. The method of claim 11 further comprising effecting a multilevel access control scheme by camouflaging said second matrix.

13. The method of claim 11 where said state information includes a graph representing the status of a network characterized by nodes and links among at least some of said nodes.

14. The method of claim 13 used to protect an arbitrary secret representable in digital form, by representing said secret as interconnections among certain of said nodes, said interconnections being represented by values of said graph.

15. The method of claim 14 where said graph, if expressed as a matrix in row- or column-major order, would comprise an array having values representing said secret.

16. The method of claim 14 where said representing said secret includes padding said secret with sufficient bits to form a perfect square.

17. The method of claim 13 where said graph is an undirected graph.

18. The method of claim 13 where said graph is a directed graph.

19. The method of claim 11 where said state information comprises at least an array including a plurality of output values of a Boolean function, each output value corresponding to a unique sequence of input values for operands of said Boolean function.

20. The method of claim 19 where said state information further includes said sequences of input values corresponding to each of said output values.

21. The method of claim 19 where:
    (a) said first and second matrices comprise arrays; and
    (b) said state information array represents output values of a Boolean function, said output values being ordered in a manner corresponding to a known but unstored hierarchy of sequences of possible input values to said Boolean function.

22. The method of claim 19 used to protect an arbitrary secret expressed in digital form, by representing said secret as the values of said state information array.

23. The method of claim 22 where said representing said secret includes padding said secret with sufficient bits to form an integer power of a base used in the computational logic of the access control system.

24. A method for operating an access control system to protect state information against unauthorized access, said method comprising the steps of:
    (a) retrieving a first matrix related to said state information from a computer-readable wallet accessible to said access control system;
    (b) accessing a composition function representing said state information as a function of said first matrix and a password stored as a second matrix;
    (c) receiving a candidate password inputted by a user;
    (d) generating candidate state information for said user by executing said composition function using as operands thereto said candidate password in conjunction with at least said first matrix stored in said wallet;
        (i) wherein said candidate state information comprises pseudo-valid state information to camouflage said state information if said candidate password is not said password;
        (ii) wherein said candidate state information comprises said state information if said candidate password is said password; and
    (e) outputting said candidate state information or bogus candidate state information to said user of said access control system.

25. The method of claim 24 where at least one of said matrices is an array represented using row- or column-major ordering.

26. The method of claim 24 where at least one of said matrices is stored on a smart card accessible to said user.

27. The method of claim 24 where said state information includes a graph representing the status of a network characterized by nodes and links among at least some of said nodes.

28. The method of claim 27 where said graph takes the form of an adjacency matrix.

29. The method of claim 27 where said composition function includes graph addition.

30. The method of claim 27 where said composition function includes a graph product operation.

31. The method of claim 27 used to protect an arbitrary secret representable in digital form, by representing said secret as interconnections among certain of said nodes, said interconnections being represented by values of said graph.

32. The method of claim 31 where said graph, if expressed as a matrix in row- or column-major order, would comprise an array having values equal to said secret.

33. The method of claim 27 where said network includes elements of a physical network.

34. The method of claim 27 where said network includes elements of a logical network.

35. The method of claim 24 where said state information comprises at least an array including a plurality of output values of a Boolean function, each output value corresponding to a unique sequence of input values for operands of said Boolean function.

36. The method of claim 35 where said state information further includes said sequences of input values corresponding to each of said output values.

37. The method of claim 35 where:
    (a) said first and second matrices comprise arrays; and
    (b) said state information array represents output values of a Boolean function, said output values being ordered in a manner corresponding to a known but unstored hierarchy of sequences of possible input values to said Boolean function.

38. The method of claim 37 used to protect an arbitrary secret expressed in digital form, by representing said secret as the values of said state information array.

39. A computer-readable medium containing logic instructions for operating an access control system to camouflage a secret so as to be accessible by an authorized user yet protected against unauthorized access, said logic instructions when executed:
(a) representing in digital form a secret to be protected against unauthorized access;
(b) storing a plurality of computer-represented objects related to said secret;
  (i) at least one of said objects being accessible by an authorized user as a password;
  (ii) at least another of said objects being stored in a computer-readable wallet accessible to said access control system; and
(c) representing said secret as a function of said plurality of objects, using a composition function; and
(d) storing, in a computer-readable memory, said composition function:
  (i) in a manner accessible to said access control system;
  (ii) so as to be executable to generate a candidate secret using a user-inputted candidate password in conjunction with at least said another object stored in said wallet;
  (iii) wherein said candidate secret comprises a pseudo-valid secret to camouflage said secret if said candidate password is not said password; and
  (iv) wherein said candidate secret comprises said secret if said candidate password is said password;
thereby protecting said secret against unauthorized access by persons not having said password.

40. The computer-readable medium of claim 39 where:
(a) said secret represents linkage information among nodes of a network;
(b) said object accessible by an authorized user is a first graph representing at least a portion of said linkage information; and
(c) said object stored in said wallet is a second graph representing at least a portion of said linkage information; and
(d) said composition function accepts as operands at least said first and second graphs.

41. The computer-readable medium of claim 39 where:
(a) said secret represents at least one possible state of a system expressible as a Boolean logic function;
(b) said object accessible by an authorized user is a first matrix representing at least one of said states of said Boolean function;
(c) said object stored in said wallet is a second matrix representing at least one of said states of said Boolean function; and
(d) said composition function accepts as operands at least said first and second matrices.

42. A computer-readable medium containing logic instructions for operating an access control system to release a secret camouflaged to be accessible to an authorized user yet protected against unauthorized access, said logic instructions when executed:
(a) accessing a plurality of computer-represented objects related to a secret;
  (i) at least one of said objects being accessible by an authorized user as a password;
  (ii) at least another of said objects being stored in a computer-readable wallet accessible to said access control system; and
(b) accessing a composition function representing said secret as a function of said plurality of objects;
(c) receiving a candidate password inputted by a user;
(d) generating a candidate secret for said user by executing said composition function using as operands thereto said candidate password in conjunction with at least said another object stored in said wallet;
  (i) wherein said candidate secret comprises a pseudo-valid secret configured to camouflage said secret if said candidate password is not said password;
  (ii) wherein said candidate secret comprises said secret if said candidate password is said password; and
(e) outputting said candidate secret to said user of said access control system.

43. The computer-readable medium of claim 42 where:
(a) said secret represents linkage information among nodes of a network;
(b) said object accessible by an authorized user is a first graph representing at least a portion of said linkage information;
(c) said object stored in said wallet is a second graph representing at least a portion of said linkage information; and
(d) said composition function accepts as operands at least said first and second graphs.

44. The computer-readable medium of claim 42 where:
(a) said secret represents at least one possible state of a system expressible as a Boolean logic function;
(b) said object accessible by an authorized user is a first array representing at least one of said states of said Boolean function; and
(c) said object stored in said wallet is a second array representing at least another of said states of said Boolean function; and
(d) said composition function accepts as operands at least said first and second arrays.

45. A computer-readable medium containing logic instructions for operating an access control system to protect state information against unauthorized access, said logic instructions when executed:
(a) obtaining state information represented in digital form;
(b) deriving from said state information a first matrix;
(c) storing said first matrix as a password usable by an authorized user;
(d) deriving from said state information a second matrix;
(e) storing said second matrix in a computer-readable wallet accessible to said access control system; and
(f) storing, in a computer-readable memory, a composition function executable to generate a candidate matrix using a user-inputted candidate password in conjunction with said second matrix;
  (i) wherein said candidate matrix comprises a pseudo-valid matrix configured to camouflage the matrix if said candidate password is not said password; and
  (ii) wherein said candidate matrix comprises said state information if said candidate password is said password;
thereby protecting said state information against unauthorized access by persons not having said password.

46. The computer-readable medium of claim 45 where said state information includes a graph representing the status of a network characterized by nodes and links among at least some of said nodes.

47. The computer-readable medium of claim 45 where said state information comprises at least an array including a plurality of output values of a Boolean function, each output value corresponding to a unique sequence of input values for operands of said Boolean function.

48. A computer-readable medium containing logic instructions for operating an access control system to protect state information against unauthorized access, said logic instructions when executed:
(a) retrieving a first matrix related to said state information from a computer-readable wallet accessible to said access control system;
(b) accessing a composition function representing said state information as a function of said first matrix and a password stored as a second matrix;
(c) receiving a candidate password inputted by a user;
(d) generating candidate state information for said user by executing said composition function using as operands thereto said candidate password in conjunction with at least said first matrix stored in said wallet;
  (i) wherein said candidate state information comprises pseudo-valid state information configured to camouflage said state information if said candidate password is not said password;
  (ii) wherein said candidate state information comprises said state information if said candidate password is said password; and
(e) outputting said candidate state information to said user of said access control system.

49. The computer-readable medium of claim 48 where said state information includes a graph representing the status of a network characterized by nodes and links among at least some of said nodes.

50. The computer-readable medium of claim 48 where said state information comprises at least an array including a plurality of output values of a Boolean function, each output value corresponding to a unique sequence of input values for operands of said Boolean function.

51. An access control server configured to camouflage a secret so as to be accessible by an authorized user yet protected against unauthorized access, comprising:
(a) a computer processor;
(b) an interface configured to receive in digital form a secret to be protected against unauthorized access;
(c) a memory configured to store a plurality of computer-represented objects related to said secret;
  (i) at least one of said objects being accessible by an authorized user as a password;
  (ii) at least another of said objects being stored in a computer-readable wallet accessible to said access control system; and
(d) a memory configured to store a composition function representing said secret as a function of said plurality of objects:
  (i) in a manner accessible to said access control system;
  (ii) so as to be executable by said processor to generate a candidate secret using a user-inputted candidate password in conjunction with at least said another object stored in said wallet;
  (iii) wherein said candidate comprises a pseudo-valid secret configured to camouflage said secret if said candidate password is not said password; and
  (iv) wherein said candidate secret comprises said secret if said candidate password is said password;
thereby protecting said secret against unauthorized access by persons not having said password.

52. An access control server to release a secret camouflaged to be accessible to an authorized user yet protected against unauthorized access, comprising:
(a) a memory configured to store a plurality of computer-represented objects related to a secret;
  (i) at least one of said objects being accessible by an authorized user as a password;
  (ii) at least another of said objects being stored in a computer-readable wallet accessible to said access control server; and
(b) a memory configured to store a composition function representing said secret as a function of said plurality of objects;
(c) an interface configured to receive a candidate password inputted by a user;
(d) a computer processor configured to execute said composition function to generate a candidate secret for said user by using as operands thereto said candidate password in conjunction with at least said another object stored in said wallet;
  (i) wherein said candidate secret comprises a pseudo-valid secret configured to camouflage said secret if said candidate password is not said password;
  (ii) wherein said candidate secret comprises said secret if said candidate password is said password; and
(e) an interface configured to output said candidate secret to said user of said access control server.

53. An access control server to protect state information against unauthorized access, comprising:
(a) a computer processor;
(b) an interface configured to obtain state information represented in digital form;
(c) a decomposition module configured to decompose said state information into at least a first matrix and a second matrix;
(d) a memory configured to store said first matrix as a password usable by an authorized user;
(e) a memory configured to store said second matrix in a computer-readable wallet accessible to said access control server; and
(f) a memory configured to store a composition function executable by said processor to generate a candidate matrix using a user-inputted candidate password in conjunction with said second matrix;
  (i) wherein said candidate state information comprises pseudo-valid state information to camouflage said state information if said candidate password is not said password; and
  (ii) wherein said candidate state information comprises said state information if said candidate password is said password;
thereby camouflaging said state information to protect said state information against unauthorized access by persons not having said password.

54. An access control server to protect state information against unauthorized access, comprising:
(a) a computer-readable wallet configured to store a first matrix related to said state information accessible to said access control server;
(b) a memory configured to store a composition function representing said state information as a function of said first matrix and a password stored as a second matrix;
(c) an interface configured to receive a candidate password inputted by a user;
(d) a computer processor configured to execute said composition function to generate candidate state information for said user by using as operands to said composition function said candidate password in conjunction with at least said first matrix stored in said wallet;

(i) wherein said candidate state information comprises pseudo-valid state information to camouflage said state information if said candidate password is not said password;
(ii) wherein said candidate state information comprises said state information if said candidate password is said password; and
(e) an interface configured to output said candidate state information to said user of said access control server.

55. An access control system to camouflage a secret so as to be accessible by an authorized user yet protected against unauthorized access, comprising:
(a) means for representing in digital form a secret to be protected against unauthorized access;
(b) means for storing a plurality of computer-represented objects related to said secret;
  (i) at least one of said objects being accessible by an authorized user as a password;
  (ii) at least another of said objects being stored in a computer-readable wallet accessible to said access control system; and
(c) means for representing said secret as a function of said plurality of objects, using a composition function; and
(d) means for storing, in a computer-readable memory, said composition function:
  (i) in a manner accessible to said access control system;
  (ii) so as to be executable to generate a candidate secret using a user-inputted candidate password in conjunction with at least said another object stored in said wallet;
  (iii) wherein said candidate secret comprises a pseudo-valid secret configured to camouflage said secret if said candidate password is not said password; and
  (iv) wherein said candidate secret comprises said secret if said candidate password is said password;
thereby camouflaging said secret to protect said secret against unauthorized access by persons not having said password.

56. An access control system releasing a secret camouflaged to be accessible to an authorized user yet protecting against unauthorized access, said method comprising the steps of:
(a) means for accessing a plurality of computer-represented objects related to a secret;
  (i) at least one of said objects being accessible by an authorized user as a password;
  (ii) at least another of said objects being stored in a computer-readable wallet accessible to said access control system; and
(b) means for accessing a composition function representing said secret as a function of said objects;
(c) means for receiving a candidate password inputted by a user;
(d) means for generating a candidate secret for said user by executing said composition function using as operands thereto said candidate password in conjunction with at least said another object stored in said wallet;
  (i) wherein said candidate secret comprises a pseudo-valid secret configured to camouflage said secret if said candidate password is not said password;
  (ii) wherein said candidate secret comprises said secret if said candidate password is said password; and
(e) means for outputting said candidate secret to said user of said access control system.

57. An access control system to protect state information against unauthorized access, comprising:
(a) means for obtaining state information represented in digital form;
(b) means for deriving from said state information a first matrix;
(c) means for storing said first matrix as a password usable by an authorized user;
(d) means for deriving from said state information a second matrix;
(e) means for storing said second matrix in a computer-readable wallet accessible to said access control system; and
(f) means for storing, in a computer-readable memory, a composition function executable to generate a candidate matrix using a user-inputted candidate password in conjunction with said second matrix;
  (i) wherein said candidate state information comprises pseudo-valid state information configured to camouflage said state information if said candidate password is not said password; and
  (ii) wherein said candidate secret comprises said state information if said candidate password is said password;
thereby camouflaging said state information to protect said state information against unauthorized access by persons not having said password.

58. An access control system to protect state information against unauthorized access, comprising:
(a) means for retrieving a first matrix related to said state information from a computer-readable wallet accessible to said access control system;
(b) means for accessing a composition function representing said state information as a function of said first matrix and a password stored as a second matrix;
(c) means for receiving a candidate password inputted by a user;
(d) means for generating candidate state information for said user by executing said composition function using as operands thereto said candidate password in conjunction with at least said first matrix stored in said wallet;
  (i) wherein said candidate state information comprises pseudo-valid state information configured to camouflage said state information if said candidate password is not said password;
  (ii) wherein said candidate secret comprises said state information if said candidate password is said password; and
(e) means for outputting said candidate state information to said user of said access control system.

59. A method for operating an access control system to protect a secret against unauthorized access, said method comprising the steps of:
(a) obtaining a secret in digital form;
(b) modeling said secret as a graph;
(c) camouflaging said secret by decomposing said graph into:
  (i) a first sub-graph to be distributed as a password to an authorized user of said system; and
  (ii) a second sub-graph to be stored in a manner accessible to said system;
  (iii) by relating said first and second sub-graphs to said graph via a composition function configured to regenerate said secret using a user-inputted candidate password in conjunction with said second sub-graph when said candidate password is said password and generate a pseudo-valid secret to camouflage said secret when said candidate password is not said password; and (d) storing said camouflaged secret for subsequent access by a user;

thereby camouflaging said secret against unauthorized access by persons not having said password.

60. A method for operating an access control system to protect a secret against unauthorized access, said method comprising the steps of:
   (a) obtaining a secret in digital form;
   (b) modeling said secret as a matrix representing at least a portion of a truth table corresponding to a Boolean function;
   (c) camouflaging said secret by decomposing said matrix into:
      (i) a first portion to be distributed as a password to an authorized user of said system; and
      (ii) a second portion to be stored in a manner accessible to said system;
      (iii) by relating said first and second portions to said matrix via a composition function configured to regenerate said secret using a user-inputted candidate password in conjunction with said second portion when said candidate password is said password and generate a pseudo-valid secret to camouflage said secret when said candidate password is not said password; and
   (d) storing said camouflaged secret for subsequent access by a user;

thereby camouflaging said secret against unauthorized access by persons not having said password.

61. A method for operating an access control system to protect a secret against unauthorized access, said method comprising the steps of:
   (a) retrieving, from a computer-readable wallet, a first sub-graph:
      (i) related to a secret camouflaged as a graph by said system; and
      (ii) accessible to an authorized user as a password;
   (b) accessing a composition function representing said secret as a function of said first sub-graph and a stored second sub-graph accessible to said system;
   (c) receiving a candidate password inputted by a user;
   (d) generating a candidate secret for said user by executing said composition function using as operands thereto said candidate password in conjunction with at least said first sub-graph;
      (i) wherein said candidate secret comprises a pseudo-valid secret in lieu of said secret to camouflage said secret if said candidate password is not said password;
      (ii) wherein said candidate secret comprises said secret if said candidate password is said password; and
   (e) outputting said candidate secret to said user of said access control system.

62. A method for operating an access control system to protect a secret against unauthorized access, said method comprising the steps of:
   (a) retrieving, from a computer-readable wallet, a first matrix:
      (i) related to a secret camouflaged as a Boolean function by said system; and
      (ii) accessible to an authorized user as a password;
   (b) accessing a composition function representing said secret as a function of said first matrix and a stored second matrix accessible to said system;
   (c) receiving a candidate password inputted by a user;
   (d) generating a candidate secret for said user by executing said composition function using as operands thereto said candidate password in conjunction with at least said first matrix;
      (i) wherein said candidate secret comprises a pseudo-valid secret configured to camouflage said secret if said candidate password is not said password;
      (ii) wherein said candidate secret comprises said secret if said candidate password is said password; and
   (e) outputting said candidate secret to said user of said access control system.

63. A computer-readable medium containing logic instructions for operating an access control system to protect a secret against unauthorized access, said logic instructions when executed:
   (a) obtaining a secret in digital form;
   (b) modeling said secret as a graph;
   (c) camouflaging said secret by decomposing said graph into:
      (i) a first sub-graph to be distributed as a password to an authorized user of said system; and
      (ii) a second sub-graph to be stored in a manner accessible to said system;
      (iii) by relating said first and second sub-graphs to said graph via a composition function configured to regenerate said secret using a user-inputted candidate password in conjunction with said second sub-graph when said candidate password is said password and generating a pseudo-valid secret to camouflage said secret when said candidate password is not said password; and
   (d) storing said camouflaged secret for subsequent access by a user;

thereby camouflaging said secret against unauthorized access by persons not having said password.

64. A computer-readable medium containing logic instructions for operating an access control system to protect a secret against unauthorized access, said logic instructions when executed:
   (a) obtaining a secret in digital form;
   (b) modeling said secret as a matrix representing at least a portion of a truth table corresponding to a Boolean function;
   (c) camouflaging said secret by decomposing said matrix into:
      (i) a first portion to be distributed as a password to an authorized user of said system; and
      (ii) a second portion to be stored in a manner accessible to said system;
      (iii) by relating said first and second portions to said matrix via a composition function configured to regenerate said secret using a user-inputted candidate password in conjunction with said second portion when said candidate password is said password and generating a pseudo-valid secret to camouflage said secret when said candidate password is not said password; and
   (d) storing said camouflaged secret for subsequent access by a user;

thereby camouflaging said secret against unauthorized access by persons not having said password.

65. A computer-readable medium containing logic instructions for operating an access control system to protect a secret against unauthorized access, said logic instructions when executed:
   (a) retrieving, from a computer-readable wallet, a first sub-graph:

(i) related to a secret camouflaged as a graph by said system; and
(ii) accessible to an authorized user as a password;
(b) accessing a composition function representing said secret as a function of said first sub-graph and a stored second sub-graph accessible to said system;
(c) receiving a candidate password inputted by a user;
(d) generating a candidate secret for said user by executing said composition function using as operands thereto said candidate password in conjunction with at least said first sub-graph;
  (i) wherein said candidate secret comprises a pseudo-valid secret configured to camouflage said secret if said candidate password is not said password;
  (ii) wherein said candidate secret comprises said secret if said candidate password is said password; and
(e) outputting said candidate secret to said user of said access control system.

66. A computer-readable medium containing logic instructions for operating an access control system to protect a secret against unauthorized access, said logic instructions when executed:
(a) retrieving, from a computer-readable wallet, a first matrix:
  (i) related to a secret camouflaged as a Boolean function by said system; and
  (ii) accessible to an authorized user as a password;
(b) accessing a composition function representing said secret as a function of said first matrix and a stored second matrix accessible to said system;
(c) receiving a candidate password inputted by a user;
(d) generating a candidate secret for said user by executing said composition function using as operands thereto said candidate password in conjunction with at least said first matrix;
  (i) wherein said candidate secret comprises a pseudo-valid secret configured to camouflage said secret if said candidate password is not said password;
  (ii) wherein said candidate secret comprises said secret if said candidate password is said password; and
(e) outputting said candidate secret to said user of said access control system.

* * * * *

UNITED STATES PATENT AND TRADEMARK OFFICE
CERTIFICATE OF CORRECTION

| | | |
|---|---|---|
| PATENT NO. | : 7,454,782 B2 | Page 1 of 1 |
| APPLICATION NO. | : 10/015902 | |
| DATED | : November 18, 2008 | |
| INVENTOR(S) | : Sanguthevar Rajasekaran et al. | |

It is certified that error appears in the above-identified patent and that said Letters Patent is hereby corrected as shown below:

Cover Page, item [56] under Other Publications, add --Bruce Schneier, Applied Cryptography: Protocols, Algorithms, and Source Code in C, $1^{st}$ edition, John Wiley and Sons, N.Y. (1992) pages 415-417 (section 17.3)--

Column 13, line 49, after "can" insert --be--

Signed and Sealed this

Sixth Day of January, 2009

JON W. DUDAS
*Director of the United States Patent and Trademark Office*